US 9,182,304 B2

(12) United States Patent
Namiki et al.

(10) Patent No.: US 9,182,304 B2
(45) Date of Patent: Nov. 10, 2015

(54) POWER METER, POWER MEASUREMENT METHOD, PROGRAM AND STORAGE MEDIUM

(75) Inventors: Tsuyoshi Namiki, Kanagawa (JP); Ryujiro Fujita, Kanagawa (JP); Takehiko Shioda, Kanagawa (JP); Akio Fukushima, Kanagawa (JP); Yasuteru Kodama, Kanagawa (JP); Ryushin Kametani, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/348,060

(22) PCT Filed: Sep. 30, 2011

(86) PCT No.: PCT/JP2011/072679
§ 371 (c)(1),
(2), (4) Date: Apr. 7, 2014

(87) PCT Pub. No.: WO2013/046473
PCT Pub. Date: Apr. 4, 2013

(65) Prior Publication Data
US 2014/0283622 A1  Sep. 25, 2014

(51) Int. Cl.
*G01L 5/00* (2006.01)
*G01L 5/22* (2006.01)
(Continued)

(52) U.S. Cl.
CPC .................. *G01L 5/225* (2013.01); *B62M 3/00* (2013.01); *G01L 3/24* (2013.01); *B62J 2099/002* (2013.01);
(Continued)

(58) Field of Classification Search
CPC ............ G01L 5/24; G01L 5/225; G01L 3/24; G01L 5/0042; G01L 25/003; B62J 2099/002; B62J 2099/0026
See application file for complete search history.

(56) References Cited

U.S. PATENT DOCUMENTS 5,027,303 A * 6/1991 Witte ..................... A61B 5/222
482/8
5,031,455 A * 7/1991 Cline ..................... A63B 24/00
73/379.01
(Continued)

FOREIGN PATENT DOCUMENTS

| JP | 59-118298 | 7/1984 |
| JP | 07-257473 | 10/1995 |
| WO | 2008058164 | 5/2008 |

OTHER PUBLICATIONS

International Search Report PCT/JP2011/072679 dated Dec. 27, 2011.

*Primary Examiner* — Lisa Caputo
*Assistant Examiner* — Tran M Tran
(74) *Attorney, Agent, or Firm* — Young & Thompson

(57) ABSTRACT

A power meter includes a first measurement unit 7 that measures a force applied to a first pedal B322 and calculates predetermined first information (power and/or torque) on the first pedal B322, and a second measurement unit 6 that measures a force applied to a second pedal B321 and calculates second information (power and/or torque) on the second pedal B321, which is the same kind of the first information. The first measurement unit 7 transmits first information data indicating the first information to the second measurement unit 6, and the second measurement unit 6 adds the first information to the second measurement information and transmits an added value data indicating an added value obtained by adding the first information to the second information.

9 Claims, 22 Drawing Sheets

(51) Int. Cl.
  B62M 3/00       (2006.01)
  G01L 3/24       (2006.01)
  G01L 25/00          (2006.01)
  G01L 5/24           (2006.01)
  B62J 99/00          (2009.01)

(52) U.S. Cl.
  CPC ...... *B62J 2099/0026* (2013.01); *B62K 2207/00* (2013.01); *G01L 5/0042* (2013.01); *G01L 5/24* (2013.01); *G01L 25/003* (2013.01)

(56) References Cited

U.S. PATENT DOCUMENTS

| | | | | |
|---|---|---|---|---|
| 5,816,599 A * | 10/1998 | Soejima | | B62M 1/36 |
| | | | | 280/259 |
| 6,263,992 B1 * | 7/2001 | Li | | B62M 6/45 |
| | | | | 180/206.3 |
| 7,806,006 B2 * | 10/2010 | Phillips | | G01L 3/1457 |
| | | | | 280/259 |
| 8,006,574 B2 * | 8/2011 | Meyer | | G01L 3/1457 |
| | | | | 702/44 |
| 8,065,926 B2 * | 11/2011 | Meyer | | G01L 3/1471 |
| | | | | 73/862.325 |
| 8,091,674 B1 * | 1/2012 | Zhang | | B62M 6/50 |
| | | | | 180/205.1 |
| 8,336,400 B2 * | 12/2012 | Lassanske | | B60B 27/0068 |
| | | | | 73/862.29 |
| 8,746,081 B2 * | 6/2014 | Sasaki | | B62M 3/003 |
| | | | | 73/862.045 |
| 8,833,182 B2 * | 9/2014 | Tetsuka | | B62M 3/003 |
| | | | | 73/862.621 |
| 8,844,377 B2 * | 9/2014 | Yap | | G01L 3/1457 |
| | | | | 73/862.046 |
| 8,899,110 B2 * | 12/2014 | Matsumoto | | B62J 99/00 |
| | | | | 73/379.07 |
| 2007/0170688 A1 * | 7/2007 | Watson | | B62J 99/00 |
| | | | | 280/260 |
| 2009/0119032 A1 | 5/2009 | Meyer | | |
| 2009/0120208 A1 | 5/2009 | Meyer | | |
| 2012/0330572 A1 * | 12/2012 | Longman | | G01L 3/247 |
| | | | | 702/44 |
| 2013/0104650 A1 * | 5/2013 | Bailey | | G01P 3/00 |
| | | | | 73/495 |
| 2013/0205916 A1 * | 8/2013 | Kodama | | A63B 24/0062 |
| | | | | 73/862.69 |

* cited by examiner

ROTATION ANGLE DETERMINATION TABLE FOR LEFT LEG

A

| COUNTER VALUE | CRANK ROTATION ANGLE Θ |
|---|---|
| 1 | 180 |
| 2 | 210 |
| 3 | 240 |
| 4 | 270 |
| 5 | 300 |
| 6 | 330 |
| 7 | 0 |
| 8 | 30 |
| 9 | 60 |
| 10 | 90 |
| 11 | 120 |
| 12 | 150 |

ROTATION ANGLE DETERMINATION TABLE FOR RIGHT LEG

B

| COUNTER VALUE | CRANK ROTATION ANGLE Θ |
|---|---|
| 1 | 0 |
| 2 | 30 |
| 3 | 60 |
| 4 | 90 |
| 5 | 120 |
| 6 | 150 |
| 7 | 180 |
| 8 | 210 |
| 9 | 240 |
| 10 | 270 |
| 11 | 300 |
| 12 | 330 |

*FIG. 18*

POWER METER, POWER MEASUREMENT METHOD, PROGRAM AND STORAGE MEDIUM

TECHNICAL FIELD

The present invention relates to a power meter that measures the power of the pedals of a vehicle when the cranks connected to the pedals are rotated, and also relates to a power measurement method, a program and a storage medium.

BACKGROUND ART

Conventionally, a device called "cycle computer" mounted on a bicycle has been known, which calculates information on the running of the bicycle and information on the exercise of the cyclist, and displays these pieces of information. Such a cycle computer calculates predetermined information, based on detection signals transmitted from various sensors provided on the bicycle.

For example, there is a cycle computer that calculates the total power and torque of the pedaling, based on detection signals (measured data) transmitted from strain sensors provided on the right and left pedals, and displays the result. For another example, there is a cycle computer that calculates the total power and torque of the pedaling, based on a detection signal transmitted from a sensor provided on a sprocket, and displays the result.

SUMMARY OF INVENTION

Technical Problem

As described above, there are cycle computers as power meters having different configurations and standards, which calculate the power and torque. Therefore, calculation methods and sensors used for the detection vary with the types of the cycle computers. That is, sensors applicable to a cycle computer as a power meter are predetermined. Therefore, if a cycle computer does not support the sensors provided on the bicycle, it is not possible to measure power and so forth.

In view of the background set forth in the preceding paragraphs, it is therefore an object of the present invention to provide a power meter that can solve the above-described problem.

Solution to Problem

To solve the above-described problem, a power meter for use with a vehicle that individually measures a force applied to each of pedals of the vehicle, when cranks connected to the pedals are rotated, the power meter comprising: a first measurement unit configured to measure a force applied to a first pedal and calculate predetermined first information on the first pedal based on a measured value; and a second measurement unit configured to measure a force applied to a second pedal and calculate predetermined second information on the second pedal based on a measured value, the second information being a same kind of the first information, wherein: the first measurement unit transmits first information data to the second measurement unit, the first information data indicating the first information calculated by the first measurement unit; and the second measurement unit adds the first information indicated by the first information data transmitted from the first measurement unit, to the second information calculated by the second measurement unit, and transmits to a predetermined controller added value data indicating an added value obtained by adding the first information to the second information.

To solve the above-described problem, a method of measuring power of pedals of a vehicle, when cranks connected to the pedals are rotated, the method comprising: a first transmission step including: measuring a force applied to a first pedal by using a first measurement part; calculating predetermined first information on the first pedal based on a measured value; and transmitting first information data indicating the first information to a second measurement part, an addition step including: measuring a force applied to a second pedal by using the second measurement part; calculating predetermined second information on the second pedal based on a measured value, the second information being a same kind of the first information; and adding to the second information the first information indicated by the first information data transmitted from the first measurement part, and a second transmission step of transmitting to a predetermined controller added value data indicating an added value obtained by adding the first information to the second information.

To solve the above-described problem, a program stored in a power peter that measures power of pedals of a vehicle when cranks connected to the pedals are rotated, the program causing the power meter to function as: a first transmission part configured to measure a force applied to a first pedal by using a first measurement part, to calculate predetermined first information on the first pedal based on a measured value, and to transmit first information data indicating the first information to the second measurement part; an adding part configured to measure a force applied to a second pedal by using the second measurement part, to calculate predetermined second information on the second pedal that is a same kind as the first information based on a measured value, and to add to the second information the first information indicated by the first information data transmitted from the first measurement part; and a second transmission part configured to transmit to a predetermined controller added value data indicating an added value obtained by adding the first information to the second information.

BRIEF DESCRIPTION OF DRAWINGS

FIG. 18A shows a rotation angle determination table for the left leg;

FIG. 18B shows a rotation angle determination table for the right leg;

DESCRIPTION OF EMBODIMENTS

Embodiment 1

Figure 1:
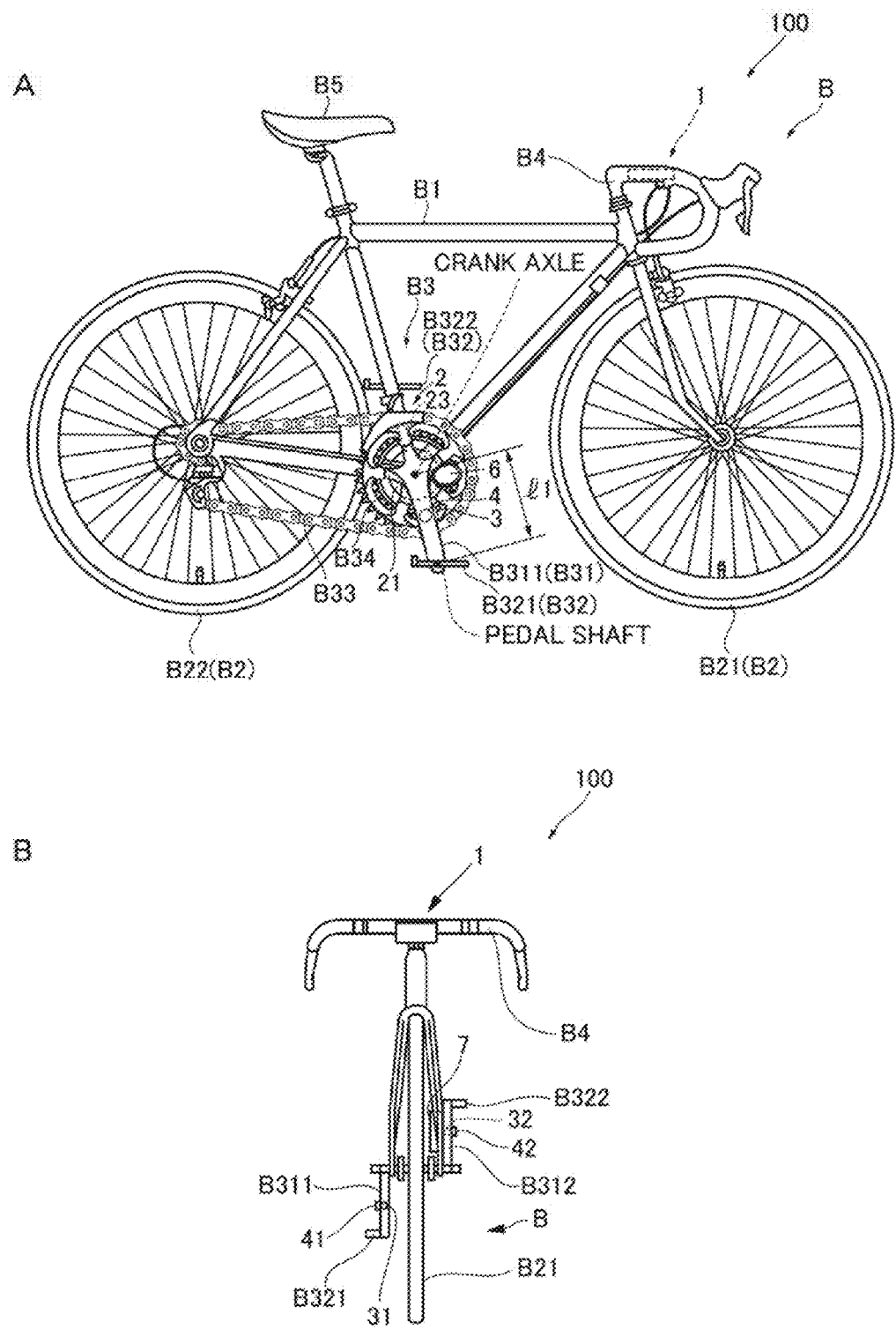
FIG. 1A is a side view showing a bicycle with a pedaling monitor.
FIG. 1B is a front view showing the bicycle with the pedaling monitor.

Hereinafter, the embodiments of the present invention will be described with reference to the drawings. FIG. 1A is a side view showing a bicycle B with a pedaling monitor 100 that calculates pedal effort of each of the right and left pedaling every predetermined crank rotation angle and displays the result. FIG. 1B is a front view showing the bicycle B with the pedaling monitor 100. The bicycle B includes: a flame B1 of the bicycle body; two wheels B2 pivotally supported with the frame B1 on the front and back of the bicycle B (front wheel B21 and rear wheel B22) to movably support the frame B1; a drive mechanism B3 that transmits driving force to drive the bicycle B forward, to the rear wheel B22; a handle B4 operated by the cyclist; and a saddle B5 on which the cyclist sits.

The drive mechanism B3 includes: a crank B31 having an axis of rotation (crank axle) at its first end that is pivotably mounted with respect to the frame B1; a pedal B32 which is pivotably mounted at the second end of the crank B31 and is applied with a force from the cyclist; a chain ring B34 connected to the crank B31 to rotate together with the crank B31 with respect to the same axis of rotation, which is the crank axle at the first end of the crank B31; a chain B33 connected to a rear sprocket (not shown) provided to rotate together with the rear wheel B22 with respect to the same axis of rotation, which is the axis of rotation of the rear wheel 22, so as to transmit the force applied to the pedal B32 (hereinafter referred to as "pedal effort"), to the rear wheel B22 via the crank B31.

The crank B31 includes a right crankshaft B311 provided in the right side of the direction of forward movement of the bicycle B and a left crankshaft B312 provided in the left side of the direction of the forward movement of the bicycle B. These right and left crankshafts B311 and B312 are fixed at the positions symmetrically with respect to the crank axle. Meanwhile, the pedal B32 includes: a right pedal B321 rotatably supported by a right pedal shaft (not shown) mounted to the front end of the right crankshaft B311 and a left pedal B322 rotatably supported by a left pedal shaft (not shown) mounted to the front end of the left crankshaft B312. Here, the right crankshaft B311 and the left crankshaft B312 have the same shape and structure. Likewise, the right pedal B321 and the left pedal B322 have the same shape and structure.

The pedaling monitor 100 includes: a crank rotation angle detection sensor 2 that detects the rotation angle of the crank B31; a rotational component detection sensor 3 that detects the magnitude of the pedal effort in the rotating direction of the crank B31 (hereinafter "pedal effort rotational component"); a radial component detection sensor 4 that detects the magnitude of the pedal effort in the radial direction with respect to the crank axle or in the direction of the radius of gyration of crank B31 (hereinafter "pedal effort radial component"); a cadence detection sensor 5 that detects the rotating speed of the crank B31; a right leg unit 6 and a left leg unit 7 that each calculate the pedal effort at a predetermined crank rotation angle, based on detection signals (measured data) transmitted from the crank rotation angle sensor 2, the rotational component detection sensor 3 and the radial component detection sensor 4, and transmit the result of the calculation to a cycle computer 1; and the cycle computer 1 that displays the pedal effort at the predetermined crank rotation angle.

Here, with the present embodiment, the rotation angle of the crank is represented with respect to the right crankshaft B311. That is, when the right crankshaft B311 is positioned at twelve o'clock (the front end is turned up), the rotation angle of the crank is "0 degrees." When the right crankshaft B311 is positioned at three o'clock (the front end faces forward), the crank angle detection sensor 2 indicates that the rotation angle of the crank is "90 degrees." Moreover, when the right crankshaft B311 is positioned at nine o'clock (the front end faces backward), the crank angle detection sensor 2 indicates that the rotation angle of the crank is "270 degrees." Here, the range of the rotation angle ($\theta$) of the crank, which is detected by the crank angle detection sensor 2, is equal to or more than 0 degrees and less than 360 degrees ($0 \leq \theta < 360$ degrees). The direction in which the right crankshaft B311 rotates from twelve o'clock in clockwise direction is defined as "+ direction."

Here, the sensors 2 to 5 and the units 6 to 7 are connected to each other by wires. Meanwhile, the cycle computer 1, the right leg unit 6 and the left leg unit 7 have transmitters (not shown) and are connected to each other without wires.

Figure 2:
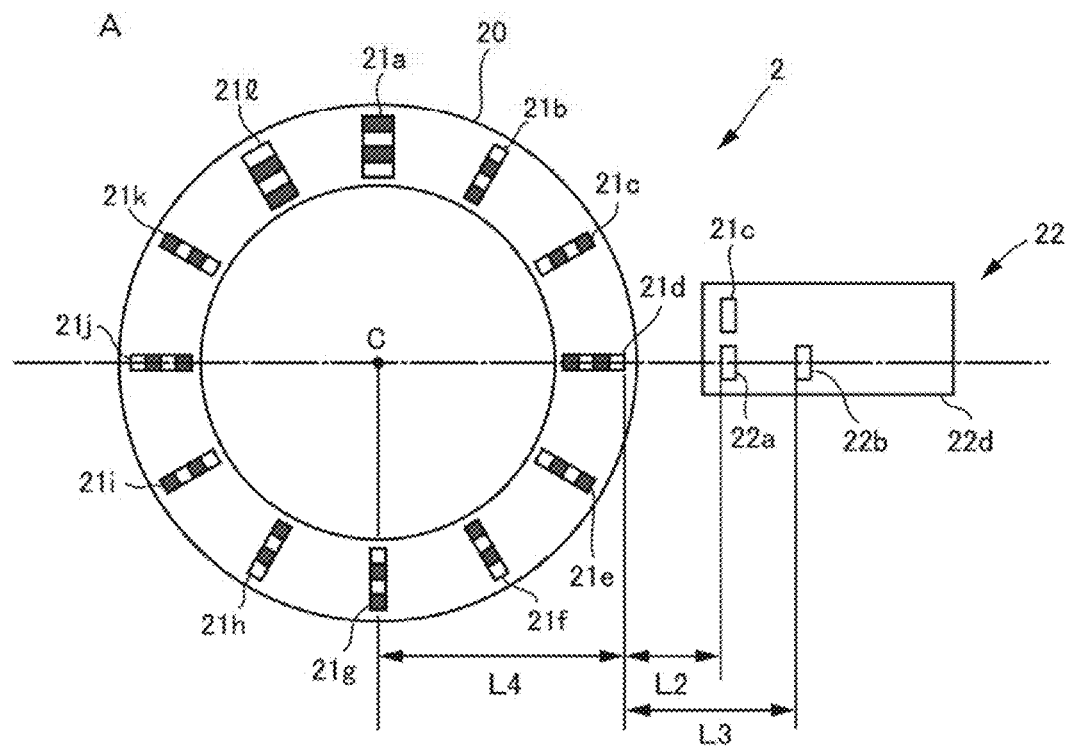
FIG. 2A is a schematic diagram showing a crank rotating angle detection sensor.
FIG. 2B is a perspective view showing a first magnet.
FIG. 2C is a perspective view showing a second magnet.
Figure 2:
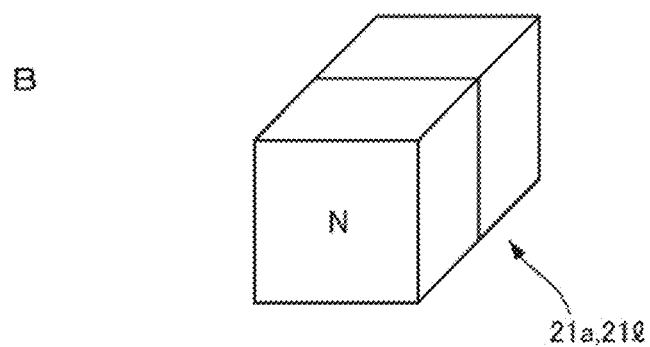
Figure 2:
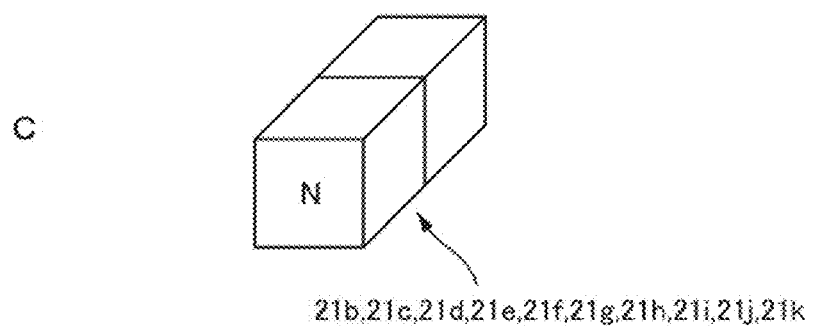

As shown in FIG. 2A, the crank rotation angle detection sensor 2 is constituted by an annular frame member 20, a group of a plurality of magnets (magnets 21a to 21l) which are fixed on the surface of the frame member 20 at a predetermined interval, and a magnetic sensor 22. The frame member 20 on which the magnet group 21 is fixed is formed of a circular ring and has an outer diameter of 54 mm and an inner diameter of 44 mm. The frame member 20 is fixed to the side face of the frame B1 such that the magnet group 21 faces the crank B31 while the center C of the frame member 20 corresponds to the crank axle. Meanwhile, the magnetic sensor 22 is fixed to the chain ring B34 and rotates together with the crank B31.

The magnet group 21 is constituted by twelve magnets 21a to 21l that are arranged every 30 degrees with respect to the center C of the annular frame member 20. The magnets 21a to 21l are neodymium magnets that have very strong magnetic forces and coercive forces. To be more specific, each of the magnets 21a and 21l is constituted by two first neodymium magnets (each 3 mm×3 mm×3 mm) in series. The north poles of the respective first neodymium magnets are arranged on the same line to face the same direction. Meanwhile, each of the other magnets 21b to 21k is constituted by two second neodymium magnets (each 2 mm×2 mm×3 mm) in series. The magnetic force of the second neodymium magnet is smaller than of the first neodymium magnet. That is, the magnet group 21 is constituted by two kinds of magnets having different magnetic forces.

In addition, each of the magnets 21a to 21l is arranged such that its center axis corresponds to the radial direction of the frame member 20. The magnets having the north poles facing the outside and the magnets having the north poles facing the inside (center) are alternately arranged. To be more specific, the north poles of the magnets 21a, 21c, 21e, 21g, 21i and 21k face the outside in the radial direction of the frame member 20. Meanwhile, the north poles of the magnets 21b, 21d, 21f, 21h, 21j and 21l face the inside (center) in the radial direction of the frame member 20. Moreover, the magnets 21a to 21l have the same distance L4 between the outer ends of the respective magnets 21a to 21l in the radial direction and the center C of the frame member 20.

The magnetic sensor 22 includes a first element 22a, a second element 22b and a third element which are accommodated in a case 22d. The first element 22a and the second element 22b detect the line of magnetic force (magnetic field) in a predetermined direction (facing to the left in the horizontal direction in FIG. 2A). The first elements 22a and the second element 22b output "Hi" when detecting the line of magnetic force opposite to their detection direction, that is, when detecting a magnet with the north pole facing the first elements 22a and the second element 22b. On the other hand, the first elements 22a and the second element 22b output "Lo" when detecting the line of magnetic force in the same direction as their detection direction, that is, when detecting a magnet with the south pole facing the first elements 22a and the second element 22b. Here, when the first element 22a and the second element 22b do not detect any line of magnetic force with a predetermined strength, they maintain the output state.

When the crank rotation angle detection sensor 2 is used (where the frame member 20 and the magnetic sensor 22 are appropriately fixed to the bicycle B), the first element 22a and the second element 22b are arranged outside the frame member 20 in the radial direction, that is, arranged with the distance from the center C of the frame member 20 that is longer than the distance between the magnets 21a to 21l and the center C of the frame member 20, viewed from the side of the bicycle B. In addition, the elements 22a and 22b have the same detection direction, and the center C of the frame member 20 is located on the detection direction. The distance between the first element 22a and the center C of the frame member 20 is shorter than the distance between the second element 22b and the center C, so that the first element 22a is closer to the outer end of each of the magnetics 21a to 21l passing on the detection direction. To be more specific, the first element 22a is provided at a position 9.0 mm away from the outer end of the closest magnet (that is, away from closer one of the cross points of the movement path of the magnets and the detection direction). Meanwhile, the second element 22b is provided at a position 13.5 mm away from the outer end of the closest magnet. It is because, as described later, the first element 22a is used to detect all the magnets 21a to 21l, and the second element is used to detect only the magnet 21a indicating the crank rotation angle=0 degrees. Here, the frame member 20 and the magnetic sensor 22 are fixed to the bicycle B such that when the crank rotation angle (θ) is 0 degrees (when the right crankshaft B311 points to twelve o'clock), the second element 22b detects the magnet 21a.

The magnetic sensor 22 also includes the third element 22c with lower power consumption than of the first element 22a and the second element 22b. The third element 22c is provided in the vicinity of the first element 22a, and, upon detecting any of the magnets 21a to 21l, activates the system of the unit 6.

Figure 3:
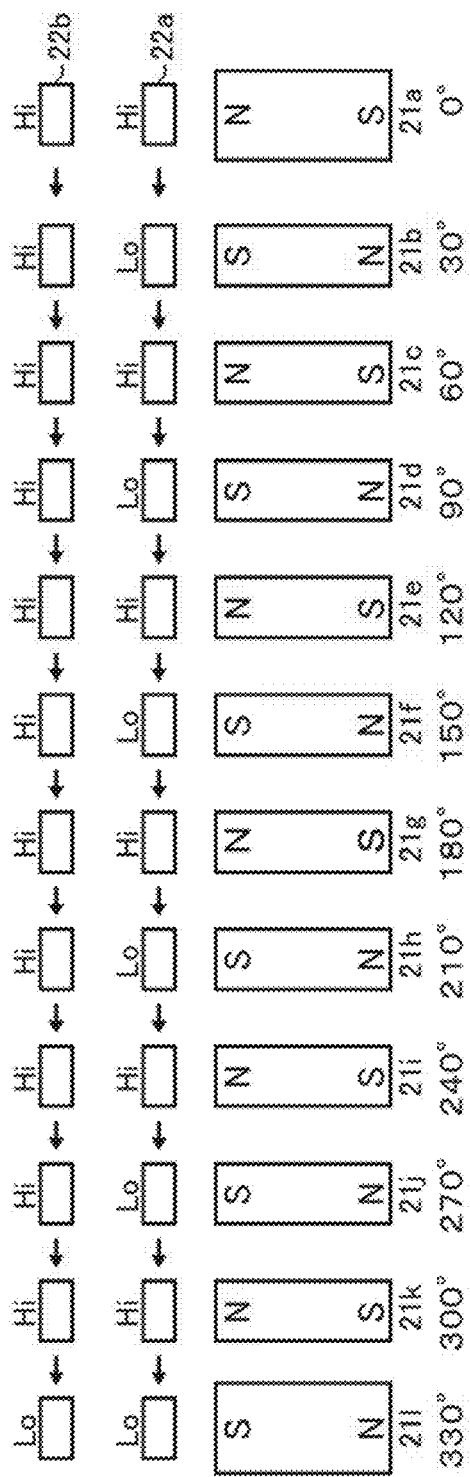
FIG. 3 is a schematic diagram showing a usage state of the crank rotating angle detection sensor.

Next, a method of detecting the crank rotation angle by the crank rotation angle detection sensor 2 will be described with reference to FIG. 3. As described above, the magnets 21a to 21l are arranged on the annular frame member 20 every 30 degrees with respect to the center C. The magnet 21a having the strongest magnetic force is located to be detected by the second element 22b when the crank rotation angle (θ) is 0 degrees (hereinafter, the magnet 21a may be referred to as "reference magnet 21a"). In addition, the directions of the north poles of the magnets 21a to 21l are alternated. Therefore, when the magnetic sensor 22 fixed to the chain ring B34 rotates around the crank axle with the rotation of the crank B31, the first element 22a of the magnetic sensor 22 switches output between Hi and Lo every time passing in front of each of the magnets 21a to 21l. Likewise, the second element 22b of the magnetic sensor 22 switches output between Hi and Lo every time passing in front of the magnets 21a and 21l. "Hi" or "Lo" is outputted from the first element 22a, so that it is possible to detect that the crank B31 has rotated 30 degrees (hereinafter referred to as "angular interval detection signal"). Meanwhile, "Hi" is outputted from the second element 22b, so that it is possible to detect that the crank rotation angle (θ) is 0 degrees (hereinafter referred to as "reference angle detection signal").

As described above, by using the angular interval detection signal and the reference angle detection signal, it is possible to detect the crank rotation angle (θ) at intervals from 0 to 30 degrees. Here, the Hi outputted from the second element 22b becomes Lo (that is, is reset) after passing in front of the magnet 21l which has the same magnetic force and has the north pole facing the opposite direction. Therefore, it is possible to continuously detect the crank rotation angle. Hereinafter, "Lo" outputted from the second element 22b will be referred to as "reset signal."

Here, it is preferred that distance L2 between the outer ends of the magnets 21a to 21l and the first element 22a, distance L3 between the outer ends of the magnets 21a to 21l and the second element 22b, and distance L4 between the center C of the frame member 20 and the outer ends of the magnets 21a to 21l satisfy the following relationship. The reason is to prevent the first element 22a from detecting the reference magnet 21a when the distance between the reference magnet 21a and the first element 22b is maximized. Here, with the present embodiment, since L2 is 9.0 mm, L3 is 13.5 mm and L4 is within a range between 47 mm and 54 mm, L2, L3 and L4 satisfy the following equation.

$$(2L4+L2)>L3 \qquad \text{Equation 1}$$

In addition, in order to prevent the first element 22a from detecting the reference magnet 21a when the distance between the first element 22a and the reference magnet 21a is maximized, it is preferred that: the second element 22b can detect the reference magnet 21a when the distance between the reference magnet 21a and the second element 22b is minimized on the detection direction of the second element 22b (hereinafter referred to as "second detection direction"); the first element 22a can detect the magnets 21c to 21l having the smallest magnetic force when the distance between the first element 22a and the magnets 21c to 21l is minimized on the detection direction of the first element 22a (hereinafter referred to as "first detection direction"); and the first element 21a cannot detect the reference magnet 21a when the distance between the reference magnet 21a and the first element 22a is maximized on the first detection direction.

Here, with the present embodiment, the center C is located on the central axis of each of the magnets 21a to 21l, and the directions of the north poles are alternated in the circumferential direction. By this means, it is possible to prevent the adjacent magnets from repelling each other, and therefore to prevent the coercive forces of the magnets 21a to 21l from decreasing.

In addition, with the present embodiment, the magnets 21a to 21l are arranged at a predetermined interval, and, when the distance between each of the magnets 21a to 21l and each of the elements 21a and 22b is minimized, the central axis of each of the magnets 21a to 21l corresponds to the detection direction of each of the elements 22a and 22b. By this means, it is possible to improve the accuracy of the crank rotation angle detection sensor 2 to detect the crank rotation angle. It is because the magnitude of the magnetic field is increased relative to each of the elements 22a and 22b.

In addition, in order to improve the accuracy of the detection of the crank rotation angle by increasing the magnetic forces of the magnets 21a to 21l, the proportion of the length of each of the magnets 21a to 21l may be increased in the central axis direction. Moreover, bobbins may be mounted to the magnets 21a to 21l.

Moreover, it is preferred that the magnets 21a to 21l are arranged on the frame member 20 such that the central axes of the magnets 21a to 21l are parallel, to the surface of the frame member 20. By this means, it is possible to reduce the thickness of the frame member 20 with respect to the magnets having the same length in the direction of the central axes (or the same intensity of the magnetic forces), and therefore reduce the cost.

Figure 4:
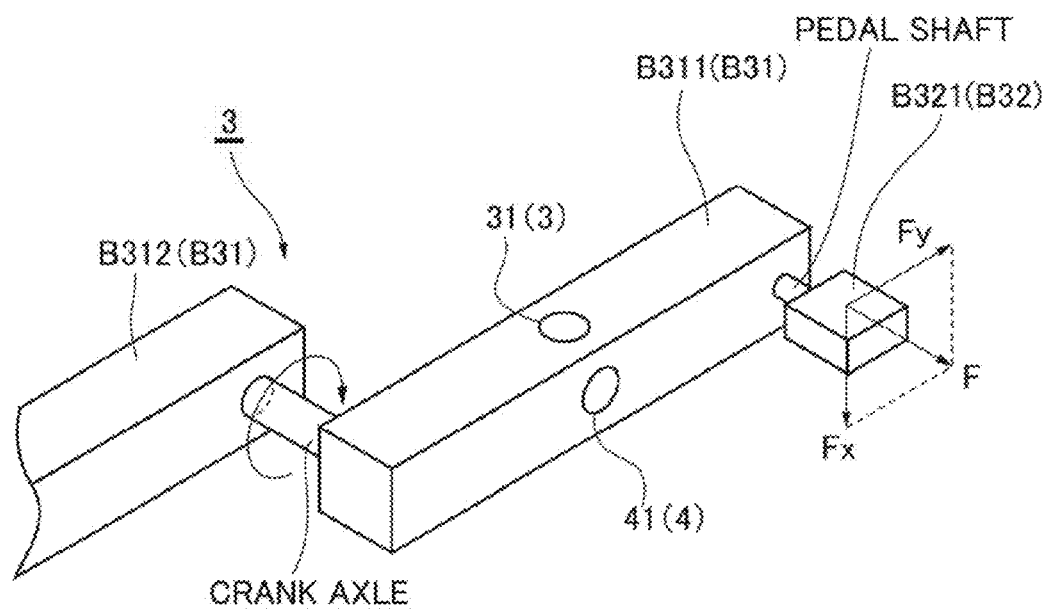
FIG. 4 shows rotational component detection sensor and a radial component detection sensor which are mounted.

The rotational component detection sensor 3 includes a unit 3a constituted by two strain sensors (hereinafter referred to as "rotational strain sensor unit 3a"). As shown in FIG. 1 and FIG. 4, the rotational component detection sensor 3 is attached to the front face of the crank B31, which faces the traveling direction when the crankshafts B311 and B312 point to six o'clock. The rotational component detection sensor 3 is constituted by a right rotational component detection sensor 31 attached to the right crankshaft B311 and a left rotational component detection sensor 32 attached to the left crankshaft B312. Moreover, the rotational component detection sensor 3 also includes a rotational strain detection circuit (not shown) connected to the terminals of the strain sensors constituting the rotational strain sensor unit 3a, and a rotational component controller that totally control the sensor 3.

Figure 5:
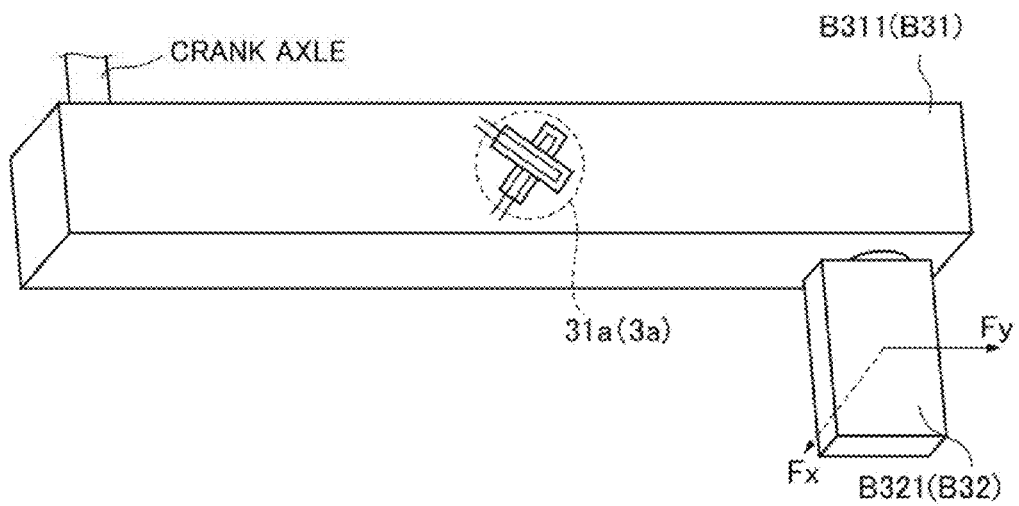
FIG. 5A shows a rotational strain sensor unit attached to a crankshaft.
FIG. 5B shows a radial strain sensor attached to the crankshaft.
Figure 5:
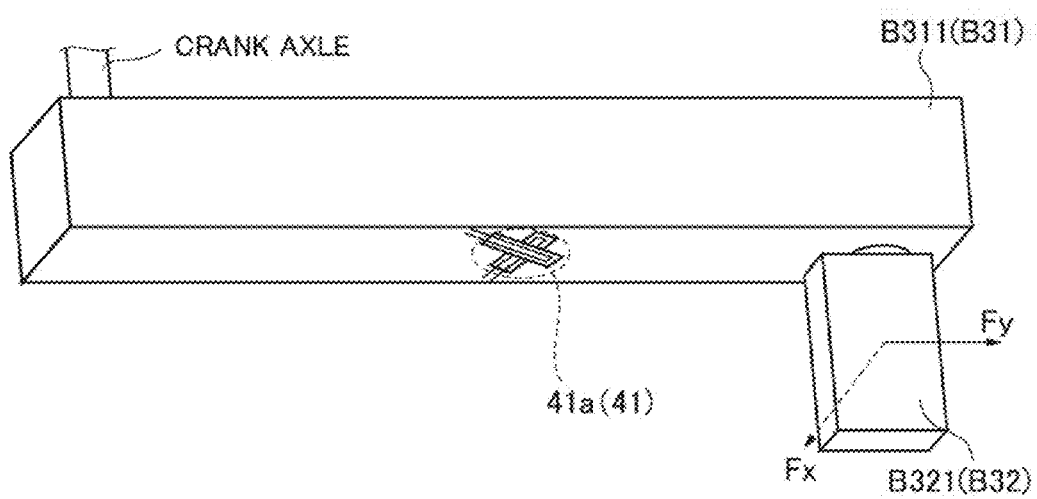

As shown in FIG. 5A, the strain sensors of the rotational strain sensor unit 31a are attached to the front face of the crankshaft B311 such that the strain sensors are orthogonal to one another. The same applies to the crankshaft B312. The rotational strain detection circuit amplifies and adjusts the output from each of the strain sensors, and transmits information indicating the total amount of strain (hereinafter referred to as "rotational strain information" to the rotational component controller. The rotational component controller of each of the sensors 31 and 32 calculates rotational component Fx(N) of the crank effort according to the following Equation 2, based on the rotational strain information transmitted from the rotational strain detection circuit, and transmits a rotational component detection signal corresponding to the rotational component Fz of the crank effort, to each of the units 6 and 7.

$$Fx = mg(X-Xz)/(Xc-Xz) \qquad \text{Equation 2}$$

Here, "m" represents mass; "g" represents acceleration of gravity; "X" represents the amount of strain detected by the rotational strain detection circuit; "Xc" represents the amount of strain in the front face of the crank B31 when vertical force (N) is applied to the pedal B32 while the crank B31 is kept horizontal; and "Xz" represents the amount of strain in the front face of the crank B31 when no load is applied to the crank B31. Here, Xc and Xz are acquired by calibrating the sensor unit 3a attached to the front face of the crank B31 before use of the sensor 3.

The radial component detection sensor 4 includes a sensor unit 4a constituted by two strain sensors (hereinafter referred to as "radial direction strain sensor unit 4a). As shown in FIG. 1 and FIG. 4, the radial component detection sensor 4 is attached to the outside face of the crank B31. The radial component detection sensor 4 is constituted by a right radial component detection sensor 41 attached to the right crankshaft B311 and a left radial component detection sensor 42 attached to the left crankshaft B312. In addition, the radial component detection sensor 4 includes a radial strain detection circuit (not shown) connected to the terminals of the strain sensors constituting the radial strain sensor unit 4a, and a radial component controller that totally controls the sensor 4.

As shown in FIG. 5B, the strain sensors of the radial strain sensor unit 41a are attached to the lateral surface of the crankshaft B311 such that the strain sensors are orthogonal to one another. The same applies to the crankshaft B312. The rotational strain detection circuit amplifies and adjusts the output of each strain sensor and transmits information indicating a total amount of strain (hereinafter referred to as "rotational strain information") detected by the sensor unit 4a to the rotational component controller. The radial component controller of each of the sensors 41 and 42 calculates a radial component Fy of the crank effort, according to the following equation 3, based on the radial strain information transmitted from each of the radial strain detection circuits, and transmits to each measurement units 6 and 7 a radial component detection signal according to the radial component Fy of the pedal effort.

$$Fy = mg(Y-Yz)/(Yu-Yz) \qquad \text{Equation 3}$$

Here, "m" represents mass; "g" represents acceleration of gravity, "Y" represents the amount of strain detected by the radial strain detection circuit: "Yu" represents the amount of strain in the lateral surface of the crank B31 when vertical force (N) is applied to the pedal B32 while the pedal B32 is located at the bottom dead center; and "Yz" represents the amount of strain in the lateral surface of the crank B31 when no load is applied to the crank B31. Here, Yu and Yz are acquired by calibrating the sensor unit 4a attached to the lateral surface of the crank B31 before use of the sensor 4.

The cadence detection sensor 5 is constituted by a magnet fixed to, for example, the left crankshaft B312 and a magnet detector mounted on the frame B1 at a predetermined position. The cadence detection sensor 5 detects the number of the rotation of the crank B31 per unit of time (one minute) by detecting the number of times n (rpm) the magnet passes through the front face of the magnet detector. This sensor 5 transmits a cadence detection signal according to the number of the rotation of the crank B31 per unit of time, to each of the units 6 and 7.

Figure 7:
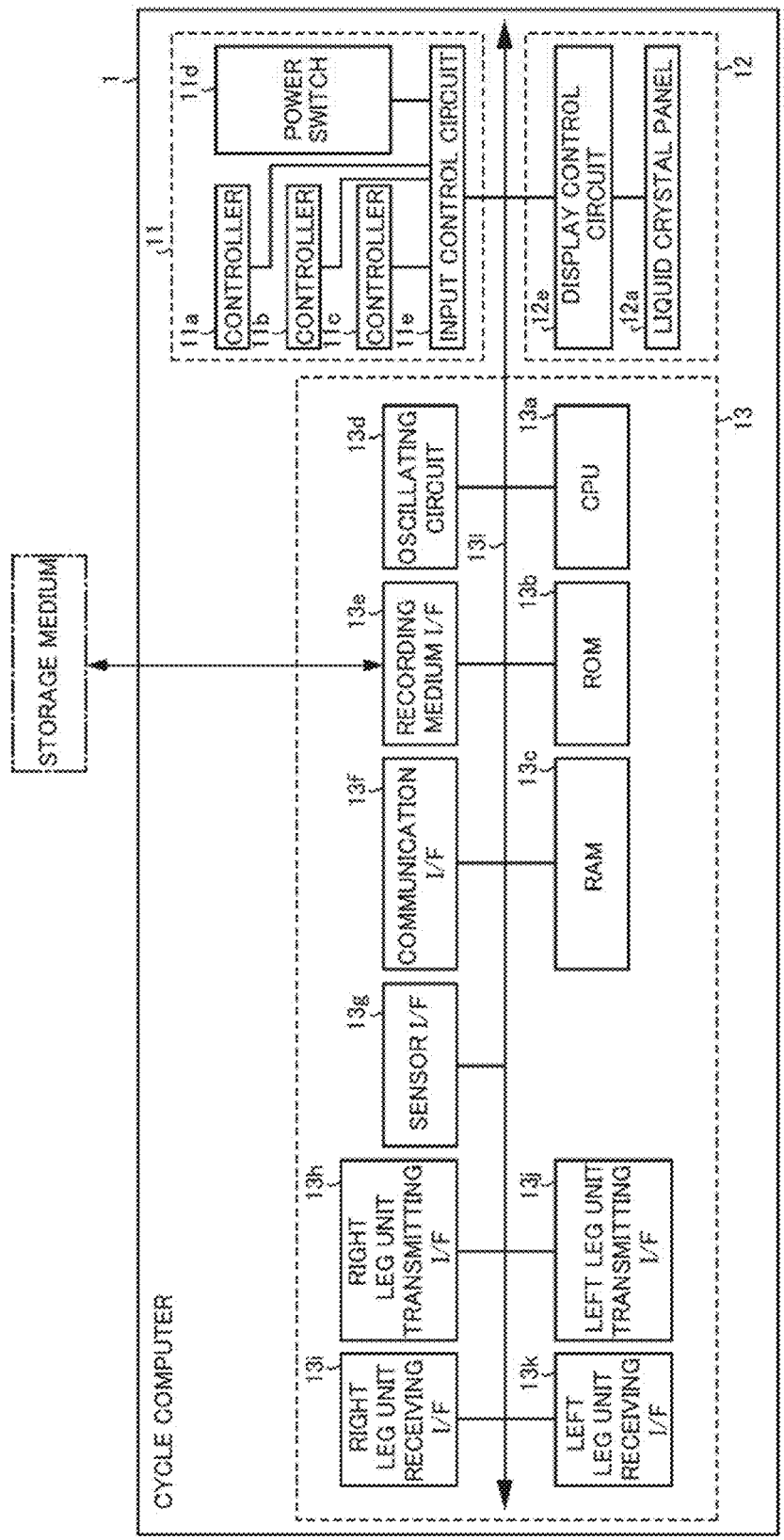
FIG. 7 is an electric block diagram showing the pedaling monitor.

Next, the configuration of the pedaling monitor 100 will be described with reference to FIG. 7. The pedaling monitor 100 includes: a right leg unit 6 that calculates torque and power (consumption energy) of the right leg, based on a right rotational component detection signal transmitted from the right rotational component detection sensor 31 and a right radial component detection signal transmitted from the right radial component detection sensor 41; a left leg unit 7 that calculates torque and power of the left leg, based on a left rotational component detection signal transmitted from the left rotational component detection sensor 32 and a left radial component detection signal transmitted from the left radial component detection sensor 42; and the cycle computer 1 that provides comprehensive or composite visualization of the result of calculation, based on the result of the calculation by both the units 6 and 7.

Figure 6:
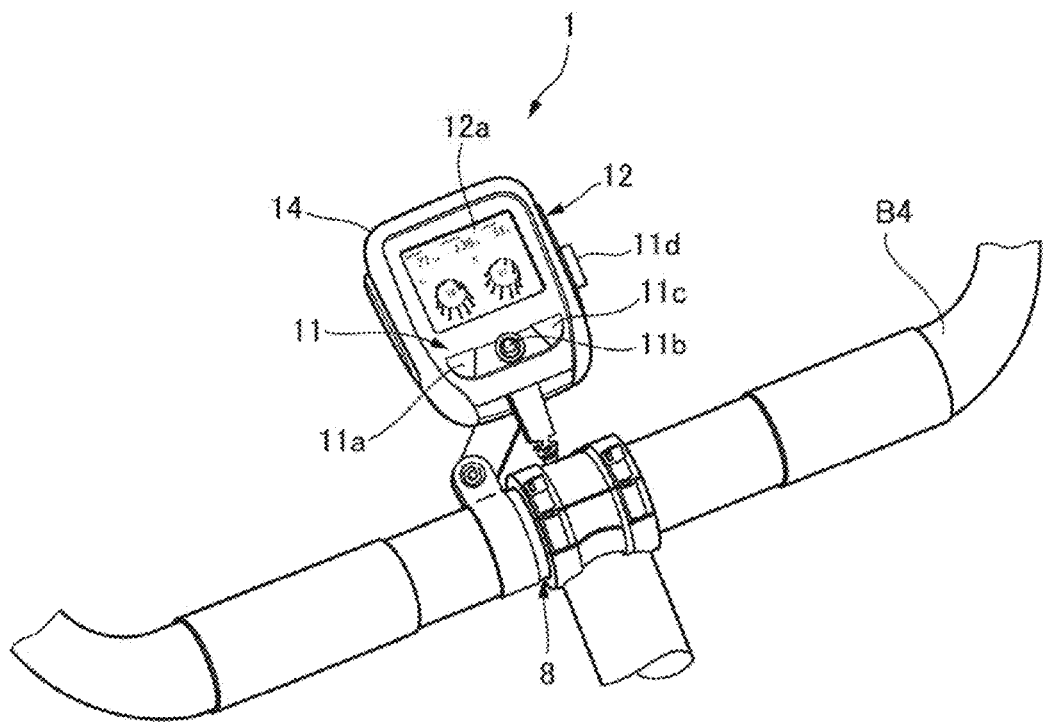
FIG. 6 is an external view showing a cycle computer.

As shown in FIG. 6, the cycle computer 1 is mounted to the bicycle B via a predetermined attaching member 8 that is removably attached to the handle B4 of the bicycle B. The cycle computer 1 includes: an input part 11 used to input predetermined information; a display part 12 used to display predetermined information; a controller 13 (see FIG. 7) having an operating circuit that performs predetermined processing for pedaling; and a housing 14 that accommodates these input part 11, display part 12 and controller 13.

The input part 11 includes: three operation parts 11a, 11b and 11c that are arranged side by side and protrude from the upper surface of the housing 14 to allow the cyclist to operate these parts; and a power switch 11d that can be slid to switch between on and off of the power supply.

As shown in FIG. 6, the input part 11 has an input control circuit 11e that relays input signals inputted by the operation of the operation parts 11a to 11c and the power switch 11d, to the controller 13, as control information. Each of the controllers 11a and 11c is formed of a button, and the operation part 11b is formed as a numerical keypad. When each of the operation parts 11a to 11c is operated, the input control circuit 11e converts the input signal into control information corresponding to the operation, and transmits the information to the controller 13. By this means, it is possible to realize a plurality of kinds of input operations whose number is equal to or greater than the kinds of the operation parts 11a to 11c, by combining the operations of these buttons. Therefore, the cyclist can perform input operations including input of unique information on the cyclist and the bicycle, input to start/stop of measurement and so forth.

The display part 12 includes: a liquid crystal panel 12a used to display torque, power and so forth for each of a predetermined crank rotation angle for each of the legs; and a display control circuit 12e that controls the display of the liquid crystal panel 12a depending on the information to be displayed. Here, another configuration is possible where the liquid crystal panel 12a may be a touch panel, and the input part 11 and the display part 12 are integrally formed.

The controller 13 of the cycle computer 1 is constituted by a CPU 13a, a ROM 13b, a RAM 13c, an oscillating circuit 13d, a recording medium I/F 13e, a communication I/F 13f, a sensor I/F 13g, a right leg unit transmitting I/F 13h, a right leg unit receiving I/F 13i, a left leg unit transmitting I/F 13j and a left leg unit receiving I/F 13k. These are connected to each other via a bus 13l.

The CPU 13a controls the basic actions of the cycle computer 1, which includes the display of predetermined parameters for pedaling, based on a program stored in the ROM 13b in advance. The ROM 13b previously stores program codes to perform the basic processing of the cycle computer 1, which is performed by the CPU 13a. The RAM 13c functions as a working area for data and so forth in arithmetic processing that is performed when the CPU 13a performs the basic processing of the cycle computer 1.

The oscillating circuit 13d has a crystal oscillator as a clock oscillator and outputs a pulse signal to the CPU 13a at a predetermined period by counting generated clock pulses. The recording medium I/F 13e is an interface for recording predetermined information on a recording medium such as a memory card and so forth. The communication I/F 13f is an interface to transmit and receive data to/from an external processing device, for example, a mobile terminal such as a cellular phone or a PC installed at home. The sensor I/F 13g is an interface to capture various kinds of detection signals transmitted from predetermined sensors. The right leg unit transmitting I/F 13h is an interface to transmit a mode conversion signal to the right leg unit 6. The right leg receiving I/F 13i is an interface to receive data from the right leg unit 6. The left leg unit transmitting I/F 13j is an interface to transmit a mode conversion signal to the left leg unit 7. The left leg unit receiving I/F 13k is an interface to receive data from the left leg unit 7. Here, the input part 11, the display part 12 and the controller 13 are connected to each other via the bus 13l to transmit and receive necessary information.

As shown in FIG. 1, the right leg unit 6 is mounted to the right crankshaft B311 of the bicycle B. The right unit 6 includes a controller 61 having an operating circuit that performs predetermined processing for the calculation of torque and power of the pedaling with the right leg, and a case 62 that accommodates the controller 61. Likewise, the left leg unit 7 is mounted on the left crankshaft B312 of the bicycle B, and includes a controller 71 having an operating circuit that performs predetermined processing for the calculation of torque and power of the pedaling with the left leg, and a case 72 that accommodates the controller 71.

Figure 8:
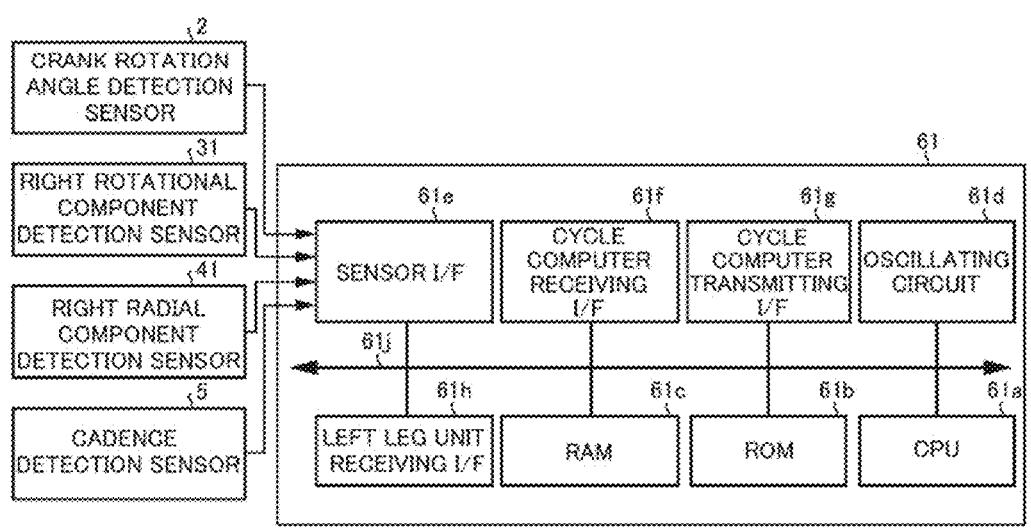
FIG. 8A is an electric block diagram showing a right leg unit.
FIG. 8B is an electric block diagram showing a left leg unit.
Figure 8:
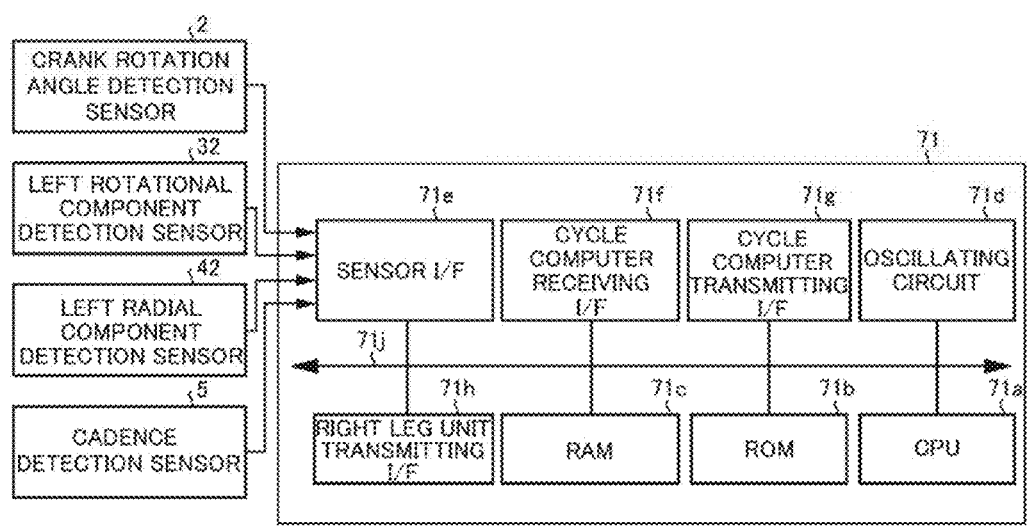

As shown in FIG. 8B, the controller 71 of the left leg unit 7 is constituted by a CPU 71a, a ROM 71b, a RAM 71c, an oscillating circuit 71d, a sensor I/F 71e, a cycle computer receiving I/F 71f, a cycle computer transmitting I/F 71g and a right leg unit transmitting I/F 71h. These components are connected to each other via a bus 71j.

The CPU 71a controls the basic actions of the left leg unit 7, which includes the calculation of torque and power of the pedaling with the left leg, based on the program stored in the ROM 13b in advance. The ROM 71b previously stores program codes to perform the basic processing of the cycle computer 1, which is performed by the CPU 71a. The RAM 71c functions as a working area for data and so forth in arithmetic processing that is performed when the CPU 71a performs the basic processing of the left leg unit 7.

The oscillating circuit 71d has a crystal oscillator as a clock oscillator and outputs a pulse signal to the CPU 71a at a predetermined period by counting clock pulses generated according to a functional mode (pedaling monitor mode/power meter mode) set at power on. The oscillating circuit 71d outputs a pulse signal at 6.05 Hz in the pedaling monitor mode, and outputs a pulse signal at 4.10 Hz in the power meter mode. The sensor I/F 71e is an interface to capture various kinds of detection signals transmitted from the above-described crank rotation angle detection sensor 2, the left rotational component detection sensor 32, the left radial component detection sensor 42 and the cadence detection sensor 5. The cycle computer receiving I/F 71*f* is an interface to receive a mode switching signal transmitted from the cycle computer 1. The cycle computer transmitting I/F 71*g* is an interface to transmit various calculated value data to the cycle computer 1 in the pedaling monitor mode. The right leg unit transmitting I/F 71*h* is an interface to transmit various calculated value data to the cycle computer 1 in the power meter mode.

As shown in FIG. 8A, the controller 61 of the right leg unit 6 is constituted by a CPU 61*a*, a ROM 61*b*, a RAM 61*c*, an oscillating circuit 61*d*, a sensor I/F 61*e*, a cycle computer receiving I/F 61*f*, a cycle computer transmitting I/F 61*g* and a left leg unit receiving I/F 61*h*. These components are connected to each other via a bus 71*j*.

The CPU 61*a* controls the basic actions of the right leg unit 6, which includes the calculation of torque and power of the pedaling with the right leg, the total torque and power of the pedaling with both legs, the accumulated torque, the accumulated power, and the contribution of the right leg, based on the program stored in the ROM 61*b* in advance. The ROM 61*b* previously stores program codes to perform the basic processing of the right leg unit 6, which is performed by the CPU 61*a*. The RAM 61*c* functions as a working area for data and so forth in arithmetic processing that is performed when the CPU 61*a* performs the basic processing of the right leg unit 6.

The oscillating circuit 61*d* has a crystal oscillator as a clock oscillator and outputs a pulse signal to the CPU 61*a* at a predetermined period by counting clock pulses generated according to the functional mode (pedaling monitor mode/power meter mode) set at power on. The oscillating circuit 61*d* outputs a pulse signal at 6.00 Hz in the pedaling monitor mode, and outputs a pulse signal at 4.00 Hz in the power meter mode. The cycle computer receiving I/F 61*e* is an interface to receive a mode switching signal transmitted from the cycle computer 1. The sensor I/F 61*f* is an interface to capture various kinds of detection signals transmitted from the above-described crank rotation angle detection sensor 2, the right rotational component detection sensor 31, the right radial component detection sensor 41 and the cadence detection sensor 5. The cycle computer transmitting I/F 61*f* is an interface to transmit various calculated value data to the cycle computer 1. The left leg unit receiving I/F 61*g* is an interface to receive various calculated value data transmitted from the left leg unit 7 in the power meter mode.

Figure 9:
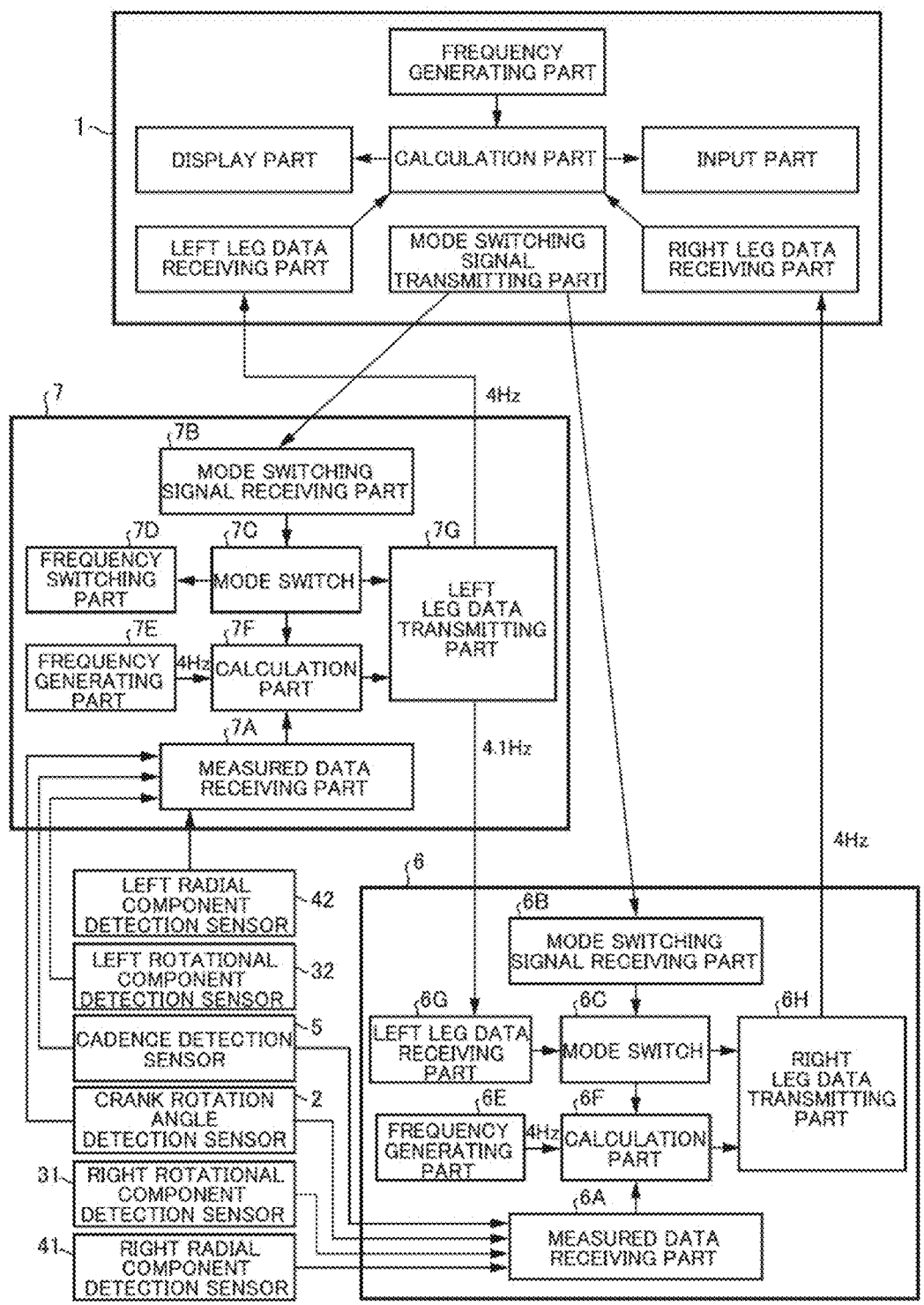
FIG. 9 is a control block diagram showing the pedaling monitor.

FIG. 9 is a control (functional) block diagram showing the configuration of the pedaling monitor 100 according to the present embodiment of the invention. The left leg unit 7 of the pedaling monitor 100 includes a measured data receiving part 7A, a mode switching signal receiving part 7B, a mode switch 7C, a frequency switching part 7D, a frequency generating part 7E, a calculation part 7F and a left leg data transmitting part 7G.

The measured data receiving part 7A receives a crank rotation angle detection signal outputted from the crank rotation angle detection sensor 2, a left rotational component detection signal, outputted from the left rotational component detection sensor 32, a left radial component detection signal outputted from the left radial component detection sensor 42 and a cadence detection signal outputted from the cadence detection sensor 5, and has a function to store those signals in storage areas of the RAM 71C.

The mode switching signal receiving part 7B receives a mode switching signal outputted from the cycle computer 1. At the time the mode switching signal receiving part 7B receives the mode switching signal, the mode switch 7C turns on a pedaling monitor mode flag in a cycle mode flag storage area of the RAM 71*c*, and switches the mode from the power meter mode as default to the pedaling monitor mode. At the time the mode switch 7C switches the mode to the pedaling monitor mode, the frequency switching part 7D switches the frequency of a pulse signal outputted from the frequency generating part 7E (oscillating circuit 71*d*) to the CPU 71*a*, from 4.10 Hz as default to 6.05 Hz.

The frequency generating part 7E has a crystal oscillator as a clock oscillator and outputs a pulse signal to the CPU 71*a* at a predetermined period by counting clock pulses generated according to the mode (pedaling monitor mode/power meter mode) set at power on.

The calculation part 7F calculates torque and power (consumption energy) for the pedaling with the left leg, based on the crank rotation angle (θ), the rotational component (N) of the pedal effort for the left leg, and the radial component (N) of the pedal effort for the left leg which are stored in the RAM 71*c*, and stores the result of the calculation in a left torque storage area and a left power storage area of the RAM 71*c*.

The left data transmitting part 7G transmits the left torque data and the left power data, based on the functional mode (power meter mode/pedaling monitor mode). When the mode is the power meter mode, the left data transmitting part 7G transmits the left torque data and the left power data to the right leg unit 6. On the other hand, when the mode is the pedaling monitor mode, the left data transmitting part 7G transmits the data to the cycle computer 1.

Meanwhile, the right unit 6 of the pedaling monitor 100 includes a measured data receiving part 6A, a mode switching signal receiving part 6B, a mode switch 6C, a frequency generating part 6E, a calculation part 6F, a left leg data receiving part 6G and a right leg data transmitting part 6H.

The measured data receiving part 6A receives a crank rotation angle detection signal outputted from the crank rotation angle detection sensor 2, a rotational component detection signal outputted from the right rotational component detection sensor 31, a radial component detection signal outputted from the right radial component detection sensor 41 and a cadence detection signal, outputted from the cadence detection sensor 5, and has a function to store those signals in storage areas of the RAM 61*c*.

The mode switching signal receiving part 6B receives a mode switching signal outputted from the cycle computer 1. At the time the mode switching signal receiving part 6B receives the mode switching signal, the mode switch 6C turns on a pedaling monitor mode flag in a cycle mode flag storage area of the RAM 61*c*, and switches the mode from the power meter mode as default to the pedaling monitor mode. At the time the mode switch 6C switches the mode to the pedaling monitor mode, the frequency switching part 6D switches the frequency of a pulse signal outputted from the frequency generating part 6E (oscillating circuit 61*d*) to the CPU 61*a*, from 4.00 Hz as default to 6.00 Hz.

The frequency generating part 6E has a crystal oscillator as a clock oscillator and outputs a pulse signal to the CPU 61*a* at a predetermined period by counting clock pulses generated irrespective of the mode (pedaling monitor mode/power meter mode) set at power on.

The calculation part 6F calculates torque and power for the pedaling with the right leg, based on the crank rotation angle (θ), the rotational component (N) of the pedal effort for the right leg, and the radial component (N) of the pedal effort for the right leg which are stored in the RAM 61*c*, and stores the result of the calculation in a right torque storage area and a right power storage area of the RAM 63*c*.

The left leg data receiving part 6G receives left torque data and left power data transmitted from the left leg unit 7 in the power meter mode, and stores the data in the left torque data storage area and the left power data storage area of the RAM 61c. The right leg data transmitting part 6H transmits predetermined calculated value data to the cycle computer 1 irrespective of the kind of the mode.

Figure 11:
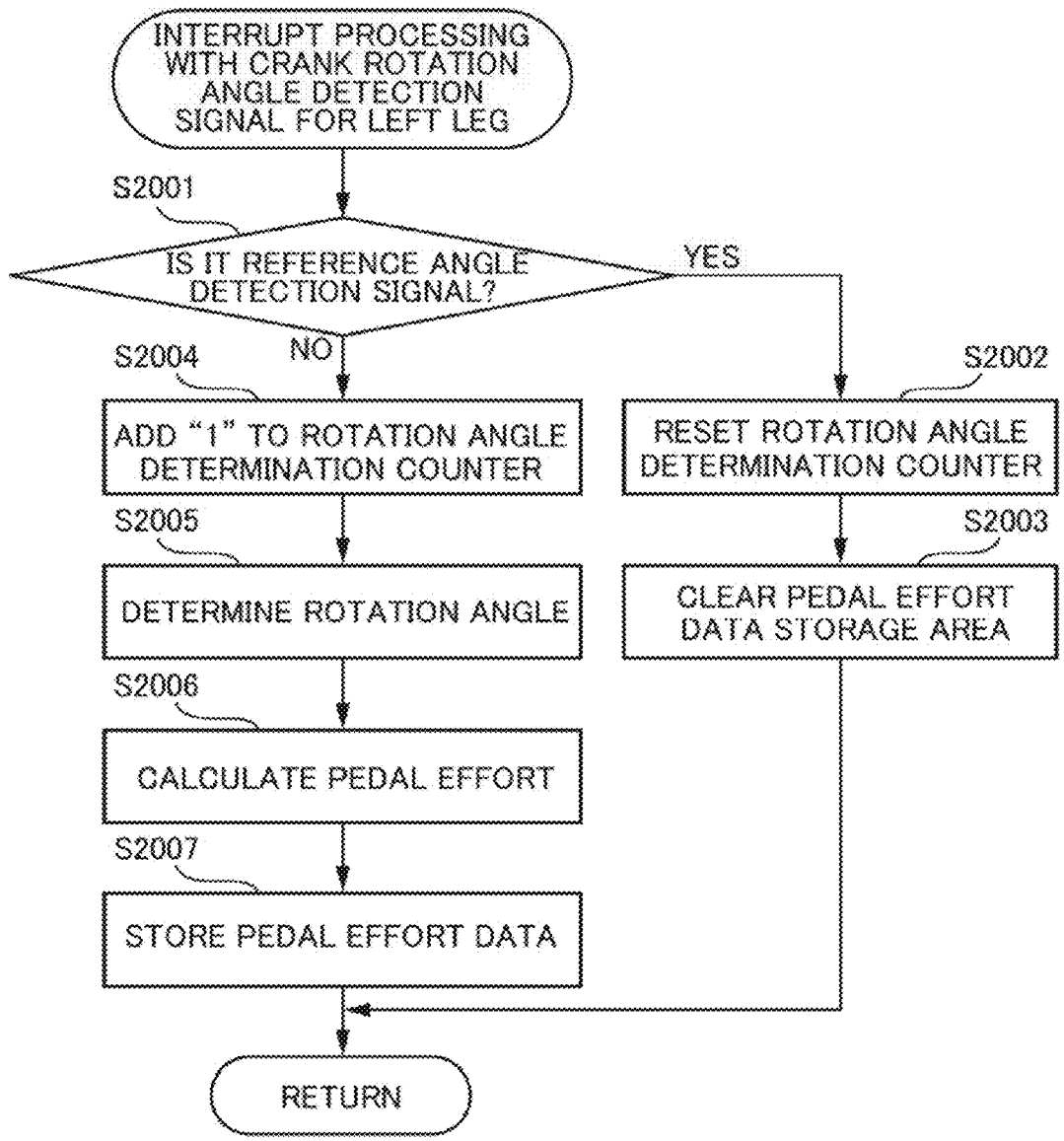
FIG. 11 is a flowchart showing interrupt processing with a crank rotation angle detection signal for the left leg.
Figure 12:
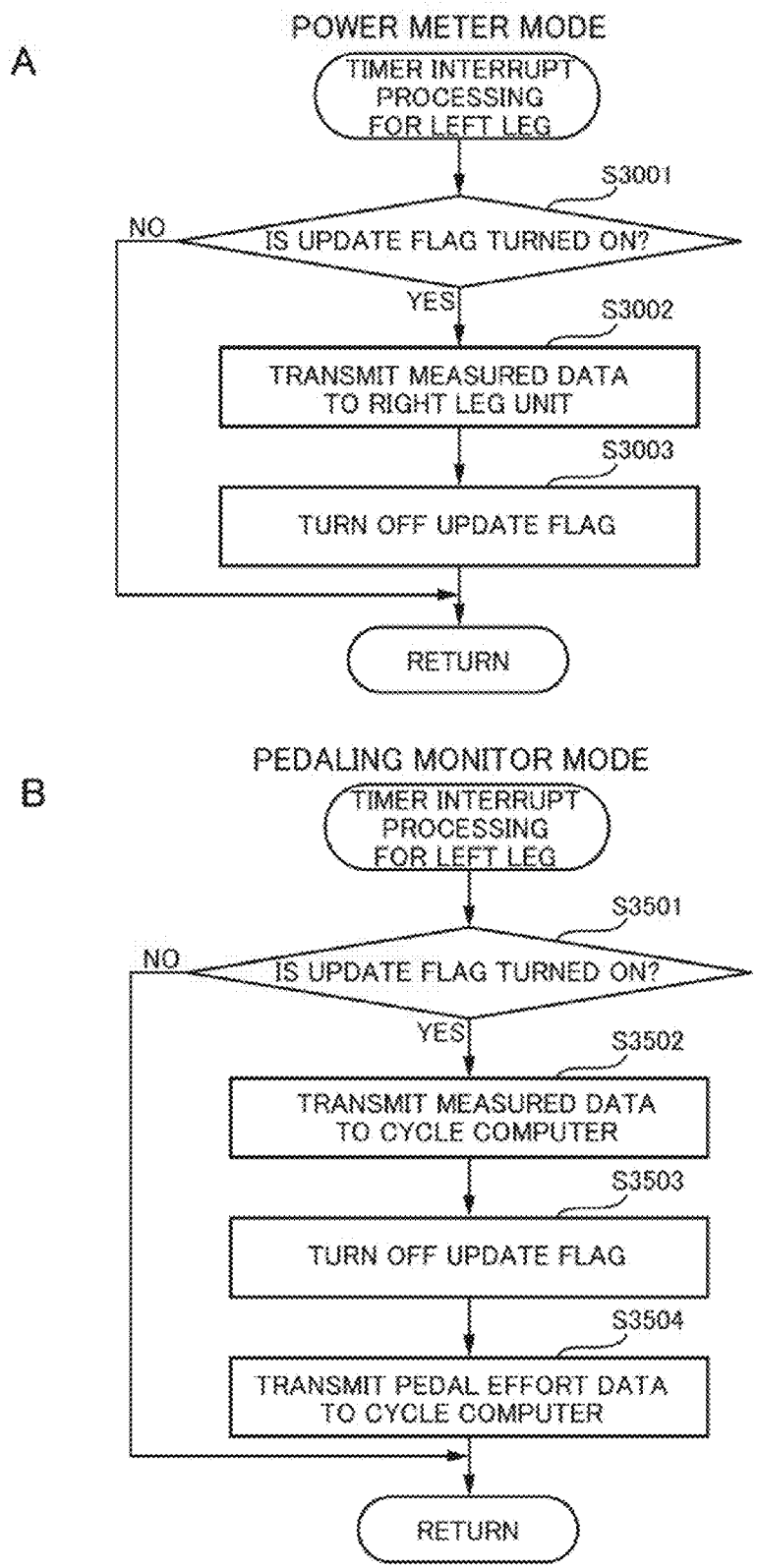
FIG. 12A is a flowchart showing left leg timer interrupt processing in a power meter mode.
FIG. 12B is a flowchart showing the left leg timer interrupt processing in a pedaling monitor mode.

Next, process and method of transmitting predetermined calculated value data (left torque data and left power data) by the left leg unit 7 will be described with reference to FIGS. 10 to 12.

<Main Processing for the Left Leg>

Figure 10:
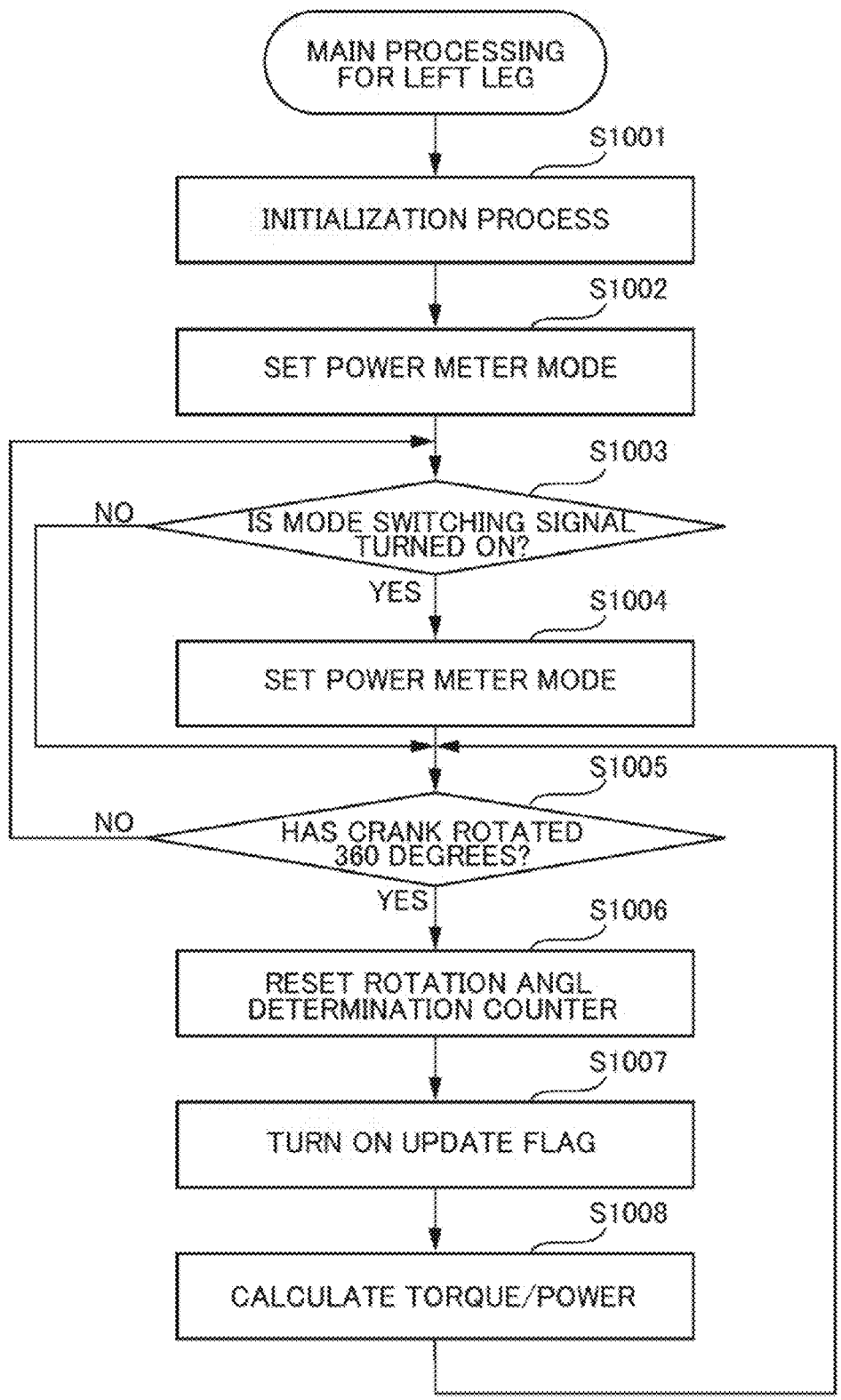
FIG. 10 is a flowchart showing a main process for the left leg.

When the left leg unit 7 is supplied with power, system reset occurs in the CPU 71a, and then, the CPU 71a starts a main process shown in FIG. 10. First, in step S100, the CPU 71a performs an initialization process. In this process, the CPU 71a reads an activation program from the ROM 71b and performs a process for the initialization of a predetermined storage area in the RAM 71c.

Next, in step S1002, the CPU 71a sets the functional mode to the power meter mode. That is, the functional mode is set to the power meter mode as default. To be more specific, a power meter flag (e.g. "00H") is turned on in the functional mode flag storage area of the RAM 71c. Then, the CPU 71a determines whether or not the cycle computer 1 outputs a mode switching signal in step S1003. When determining that a mode switching signal has not been outputted, the CPU 71a moves the step to step S1005. On the other hand, when determining that the mode switching signal has been outputted, the CPU 71a turns on a pedaling monitor mode flag (e.g. "01H") in the mode flag storage area of the RAM 71c in step S1004, so that the functional mode is set to the pedaling monitor mode.

In the step S1005, the CPU 71a determines whether or not the crank B31 rotates 360 degrees. That is, the CPU 71a determines whether or not a reference angle detection signal indicating the crank rotation angle (θ)=0 degrees has been received from the crank rotation angle detection sensor 2. Here, when determining that a reference angle detection signal has not been received, the CPU 71a returns the step to the step S1003. On the other hand, when determining that the reference angle detection signal has been received, the CPU 71a moves the step to step S1006.

In the step S1006, the CPU 71a calculates the average torque value and the average power value of the left leg for one turn of the crank B31, and stores left torque data indicating the average torque value and left power data indicating the average power value in the left torque data storage area and the left power data storage area, respectively, in the RAM 71c. In step S1007, a torque update flag and a power update flag are turned on in a torque update flag storage area and a power update flag storage area, respectively, in the PAM 71c. The steps S1003 to S1007 are repeatedly performed until predetermined interrupt processing is performed.

Here, the method of calculating the average torque value and the average power value for the left leg is not limited. As described above, the left leg unit 7 receives measured data (detection signals) transmitted from the left rotational component detection sensor 32, the left radial component detection sensor 42 and the cadence detection sensor 5 at a predetermined time interval, and stores the data in a predetermined area in the RAM 71c. Then, the CPU 71a calculates the average torque value and the average power value for the left leg, by using the data. Note that necessary data other than the measured data, such as crank length L1, is acquired by appropriate processing, for example, input processing by the input part 11 of the cycle computer 1.

<Interrupt Processing with a Crank Rotation Angle Detection Signal for the Left Leg>

Next, interrupt processing with a crank rotation angle detection signal for the left leg will be described with reference to FIG. 11. The crank rotation angle detection sensor 2 outputs to the left leg unit 7 a crank rotation angle detection signal including a reference angle detection signal or an angular interval detection signal. As a result, the following interrupt processing is performed.

In step S2001, the CPU 71a determines whether or not the signal is a reference angle detection signal. When determining that the signal is the reference angle detection signal, the CPU 71a resets a rotation angle determination counter provided in the RAM 71c, that is, the counter value is set to "0" in step S2002. In step S2003, the CPU 71a clears a pedal effect data storage area in the RAM 71c, and terminates the interrupt processing.

When determining that the signal is not a reference angle detection signal but an angular interval detection signal, the CPU 71a adds "1" to the counter value of the rotation angle determination counter to update the counter in step S2004. In step S2005, the CPU 71a determines the current crank rotation angle by using a rotation angle determination table stored in the ROM 71b. As shown in FIG. 18A, the counter values are associated with the crank rotation angles in the left leg rotation angle determination table. With the present embodiment, the crank rotation angle detection sensor 2 transmits an angular interval detection signal to the left leg unit 7 every time the crank B31 rotates 30 degrees (because one turn of the crank B31 is divided into twelve parts). Therefore, the counter values range from "1" to "12", and the crank rotation angle is increased by 30 degrees every time the counter value increments by one. Here, when the reference angle detection signal is outputted, the right crankshaft B311 points to twelve o'clock, but the left crankshaft points to six o'clock. That is, there is a phase difference of 0.180 degrees between the right crankshaft B311 and the left crankshaft B312. Therefore, when the counter value is "7", the crank rotation angle (θ) of the left crankshaft B312 is 0 degrees.

In step S2006, the CPU 71a calculates the current pedal effort F (e.g. $F=((Fx)^2+(Fy)^2)^{(1/2)}$). In step S2007, the CPU 71a stores pedal effort data indicating the pedal effort associated with the crank rotation angle in the pedal effort data storage area of the RAM 71c, and terminates the interrupt processing.

Here, with the present embodiment, the rotational component Fx and the radial component Fy for the left leg are detected, and therefore, by using the crank rotation angle (θ), the direction of the pedal effort F (for example, angle α to the surface of the ground) is calculated, so that it is possible to store pedal effort data indicating the crank rotation angle (θ), the pedal effort; (F) and the direction of the pedal effort (α). In addition, as described later, at the time the crank B31 rotates 360 degrees, the pedal effort data for one turn of the crank B31 is collectively transmitted. Therefore, note that the pedal effort data storage area in the RAM 71c has an area to store data for at least one turn of the crank B31 (for example, at least twelve pedal effort data can be stored).

<Timer Interrupt Processing for the Left Leg in the Power Meter Mode>

Next, timer interrupt processing for the left leg in the power meter mode will be described with reference to FIG. 12A. When the oscillating circuit 71d provided in the left leg unit 7 generates a clock pulse at a predetermined period, the following timer interrupt processing is performed. When receiving a pulse signal from the oscillating circuit 71d, the CPU 71a checks the functional mode flag storage area. Here, when the power meter mode flag is turned on, the CPU 71a performs steps S3001 to S3003, and meanwhile, when the pedaling monitor mode flag is turned on, the CPU 71a performs steps S3501 to S3504. As described above, a pulse signal is outputted to the CPU 71a at 4.10 Hz in the power meter mode. Therefore, in the power meter mode, the timer interrupt processing for the left leg is performed at 4.10 Hz.

In step S3001, the CPU 71a determines whether or not an update flag is turned on in the update flag storage area in the RAM 71c. When determining that the update flag is turned on, the CPU 71a transmits the left torque data and the left power data stored in the RAM 71c to the right leg unit 6 in step the S3002. In the step S3003, the CPU 71a turns off the update flag, and terminates the timer interrupt processing for the left leg. On the other hand, when determining that the update flag is not turned on, the CPU 71a simply terminates the timer interrupt processing for the left leg.

<Timer Interrupt Processing for the Left Leg in the Pedaling Monitor Mode>

Next, timer interrupt processing for the left leg in the pedaling monitor mode will be described with reference to FIG. 12B. A pulse signal is outputted to the CPU 71a at 6.05 Hz in the pedaling monitor mode. Therefore, in the pedaling monitor mode, the timer interrupt processing for the left leg is performed at 6.05 Hz.

In step the S3501, the CPU 71a determines whether or not the update flag is turned on in the update flag storage area in the RAM 71c. When determining that the update flag is turned on, the CPU 71a transmits the left torque data and the left power data stored in the RAM 71c to the cycle computer 1 in the step S3502. In the step S3503, the CPU 71a turns off the update flag.

Next, in the step S3504, the CPU 71a transmits to the cycle computer 1 a plurality of pedal effort data (for one turn of the crank B31), which are associated with predetermined crank rotation angles stored in the pedal effort data storage area of the RAM 71c, and terminates the timer interrupt processing for the left leg. When determining that the update flag is not turned on in the step S3501, the CPU 71a simply terminates the timer interrupt processing for the left leg.

Next, process and method of transmitting predetermined calculated value data (right torque data and right power data) by the right leg unit 6 will be described with reference to FIGS. 13 to 17.

<Main Processing for the Right Leg>

Figure 13:
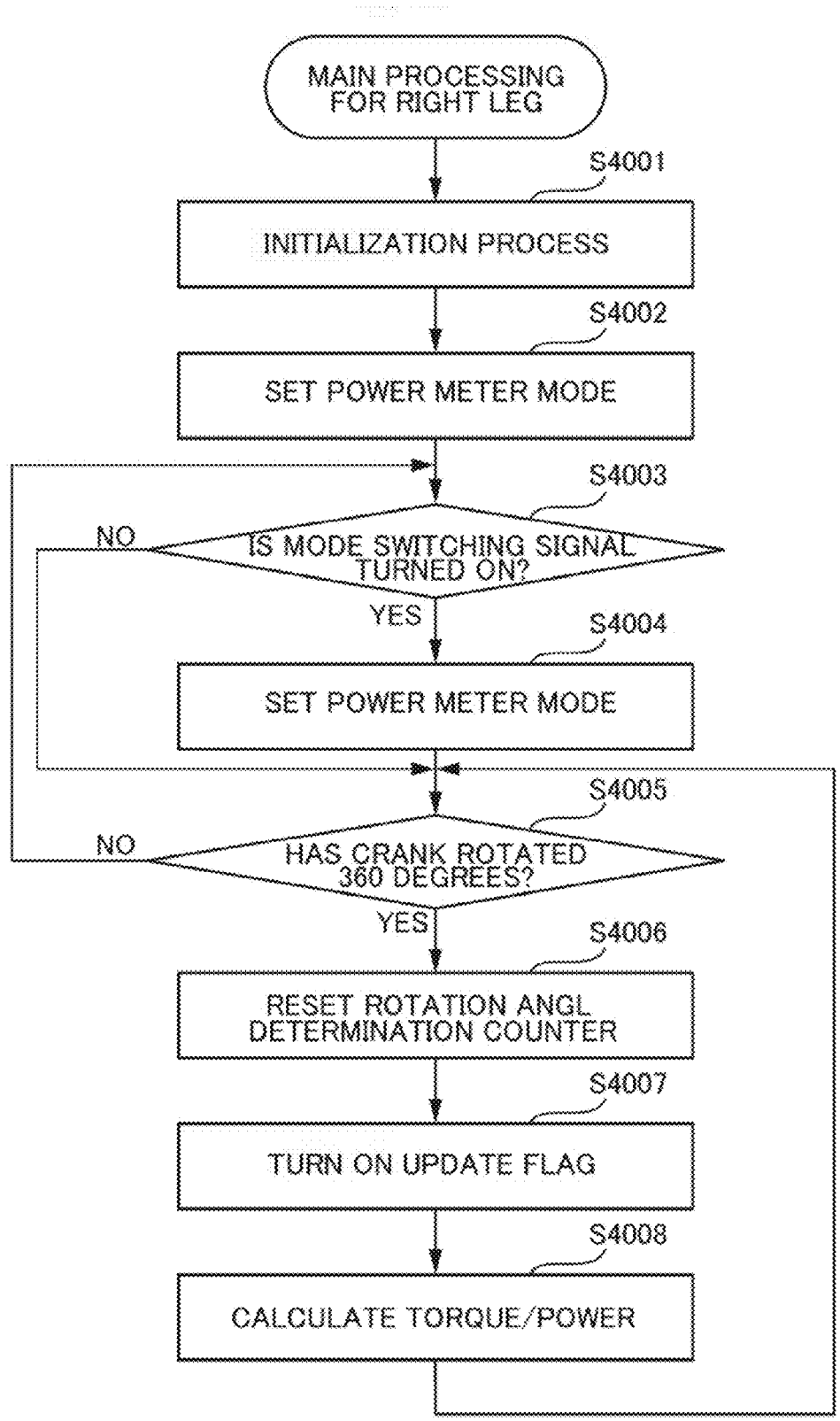
FIG. 13 is a flowchart showing a main process for the right leg.

When the right leg unit 6 is supplied with power, system reset occurs in the CPU 61a, and then, the CPU 61a starts a main process shown in FIG. 13. First, in step S4001, the CPU 61a performs an initialization process. In this process, the CPU 61a reads an activation program from the ROM 61b and performs a process for the initialization of a predetermined storage area in the RAM 61c.

Next, in step S4002, the CPU 61a sets the functional mode to the power meter mode. That is, the functional mode is set to the power meter mode as default. To be more specific, the power meter flag (e.g. "00H") is turned on in the functional mode flag storage area of the RAM 61c. Then, the CPU 61a determines whether or not the cycle computer 1 outputs a mode switching signal in step S4003. When determining that a mode switching signal has not been outputted, the CPU 61a moves the step to step S4005. On the other hand, when determining that the mode switching signal has been outputted, the CPU 61a turns on the pedaling monitor mode flag (e.g. "01H") in the mode flag storage area of the PAM 61c in step S4004, so that the functional mode is set to the pedaling monitor mode.

In the step S4005, the CPU 61a determines whether or not the crank B31 rotates 360 degrees. That is, the CPU 61a determines whether or not a reference angle detection signal indicating the crank rotation angle ($\theta$)=0 degrees has been received from the crank rotation angle detection sensor 2. Here, when determining that a reference angle detection signal indicating the crank rotation angle ($\theta$)=0 degrees has not been received, the CPU 61a returns the step to the step S4003. On the other hand, when determining that the reference angle detection signal indicating the crank rotation angle ($\theta$)=0 degrees has been received, the CPU 61a moves the step to step S4006.

In the step S4006, the CPU 61a calculates the average torque value and the average power value of the right leg for one turn of the crank B31, and stores right torque data indicating the average torque value and right power data indicating the average power value in the right torque data storage area and the right power data storage area, respectively, in the RAM 61c. In step S4007, a torque update flag and a power update flag are turned on in a torque update flag storage area and a power update flag storage area, respectively, in the PAM 61c. The steps S4003 to S4007 are repeatedly performed until predetermined interrupt processing is performed.

Here, the method of calculating the average torque value and the average power value for the right leg is not limited. As described above, the right leg unit 6 receives measured data (detection signals) transmitted from the right rotational component detection sensor 31, the right radial component detection sensor 41 and the cadence detection sensor 5 at a predetermined time interval, and stores the data in a predetermined area in the RAM 61c. Then, the CPU 61a calculates the average torque value and the average power value for the right leg, by using the data. Note that necessary data other than the measured data, such as the crank length L1, is acquired by appropriate processing, for example, input processing by the input part 11 of the cycle computer 1.

<Interrupt Processing with a Crank Rotation Angle Detection Signal for the Right Leg>

Figure 14:
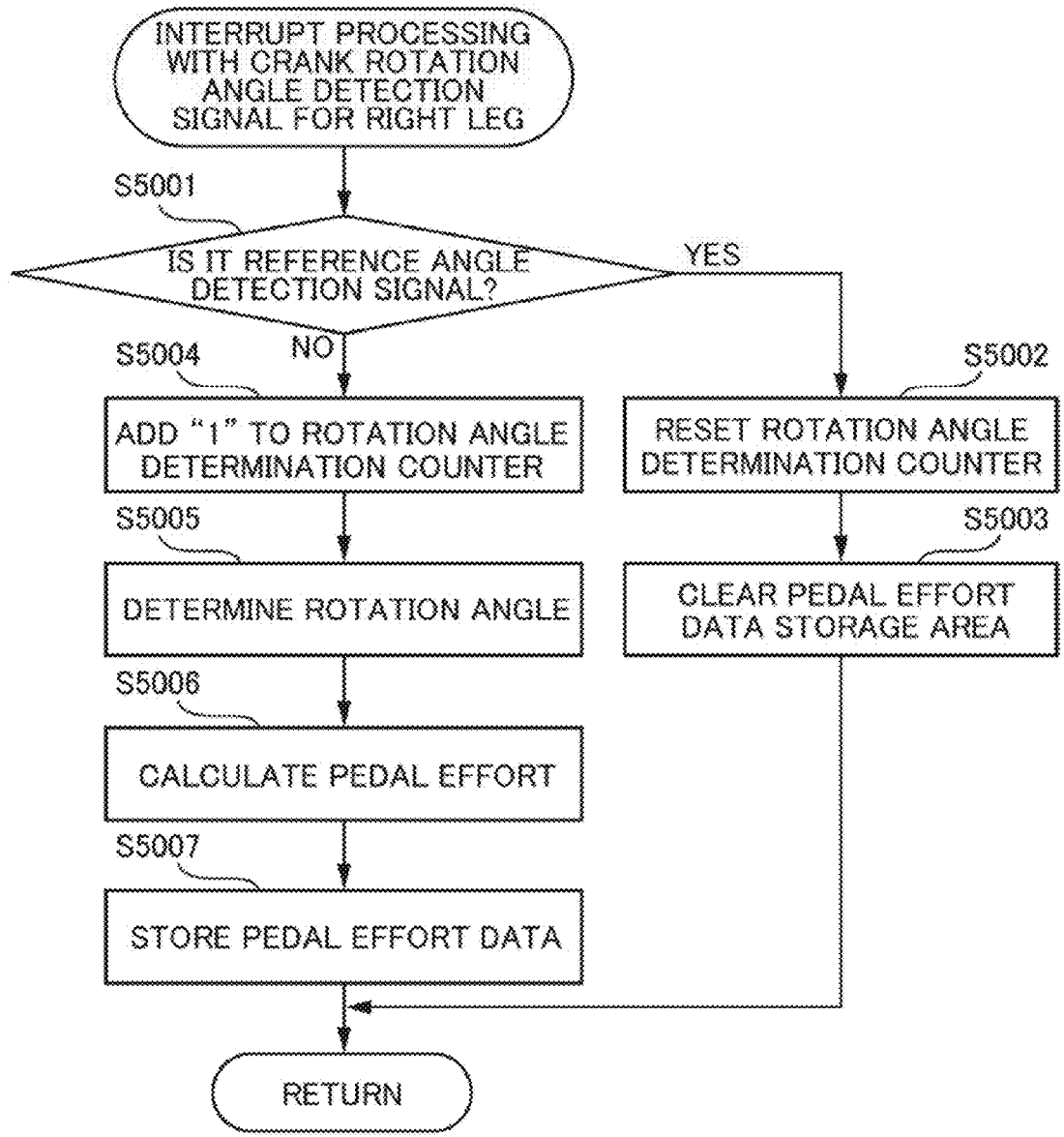
FIG. 14 is a flowchart showing interrupt processing with a crank rotation angle detection signal for the right leg.

Next, interrupt processing with a crank rotation angle detection signal for the right leg will be described with reference to FIG. 14. The crank rotation angle detection sensor 2 outputs to the right leg unit 6 a crank rotation angle detection signal including a reference angle detection signal or an angular interval detection signal. As a result, the following interrupt processing is performed.

In step S5001, the CPU 61a determines whether or not the signal is a reference angle detection signal. When determining that the signal is the reference angle detection signal, the CPU 61a resets a rotation angle determination counter provided in the RAM 61c, that is, the counter value is set to "0" in step S5002. In step S5003, the CPU 61a clears a pedal effect data storage area in the RAM 61c, and terminates the interrupt processing.

When determining that the signal is not a reference angle detection signal but an angular interval detection signal, the CPU 61a adds "1" to the counter value of the rotation angle determination counter to update the counter in step S5004. In step S5005, the CPU 61a determines the current crank rotation angle by using a rotation angle determination table stored in the ROM 61b. As shown in FIG. 18B, the counter values are associated with the crank rotation angles in the right leg rotation angle determination table. With the present embodiment, the crank rotation angle detection sensor 2 transmits an angular interval detection signal to the right leg unit 6 every time the crank B31 rotates 30 degrees. Therefore, the counter values range from "1" to "12", and the crank rotation angle is increased by 30 degrees every time the counter value increments by one. When the counter value is "1", the crank rotation angle (θ) is 0 degrees.

In step S5006, the CPU 61a calculates the current pedal effort F (F=((Fx)^+(Fy)^2)^(½)). In step S5007, the CPU 61a stores pedal effort data indicating the pedal effort associated with the crank rotation angle in the pedal effort data storage area of the RAM 61c, and terminates the interrupt processing.

Here, with the present embodiment, the rotational component Fx and the radial component Fy for the right leg is detected, and therefore, by using the crank rotation angle (θ), the direction of the pedal effort F (for example, angle α to the surface of the ground) is calculated, so that it is possible to store pedal effort data indicating the crank rotation angle (θ), the pedal effort (F) and the direction of the pedal effort (α). In addition, as described later, at the time the crank B31 rotates 360 degrees, the pedal effort data for one turn of the crank B31 is collectively transmitted. Therefore, note that the pedal effort data storage area in the RAM 61c has an area to store data for at least one turn of the crank B31 (for example, at least twelve pedal effort data can be stored).

<Interrupt Processing on Receiving Left Leg Data>

Figure 15:
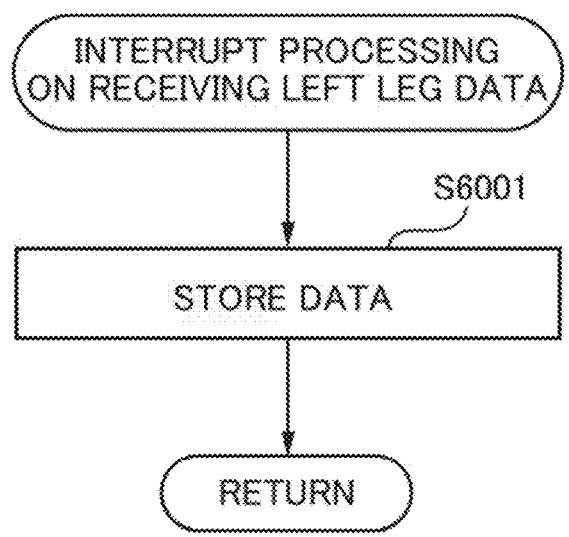
FIG. 15 is a flowchart showing interrupt processing on receiving left leg data.
Figure 16:
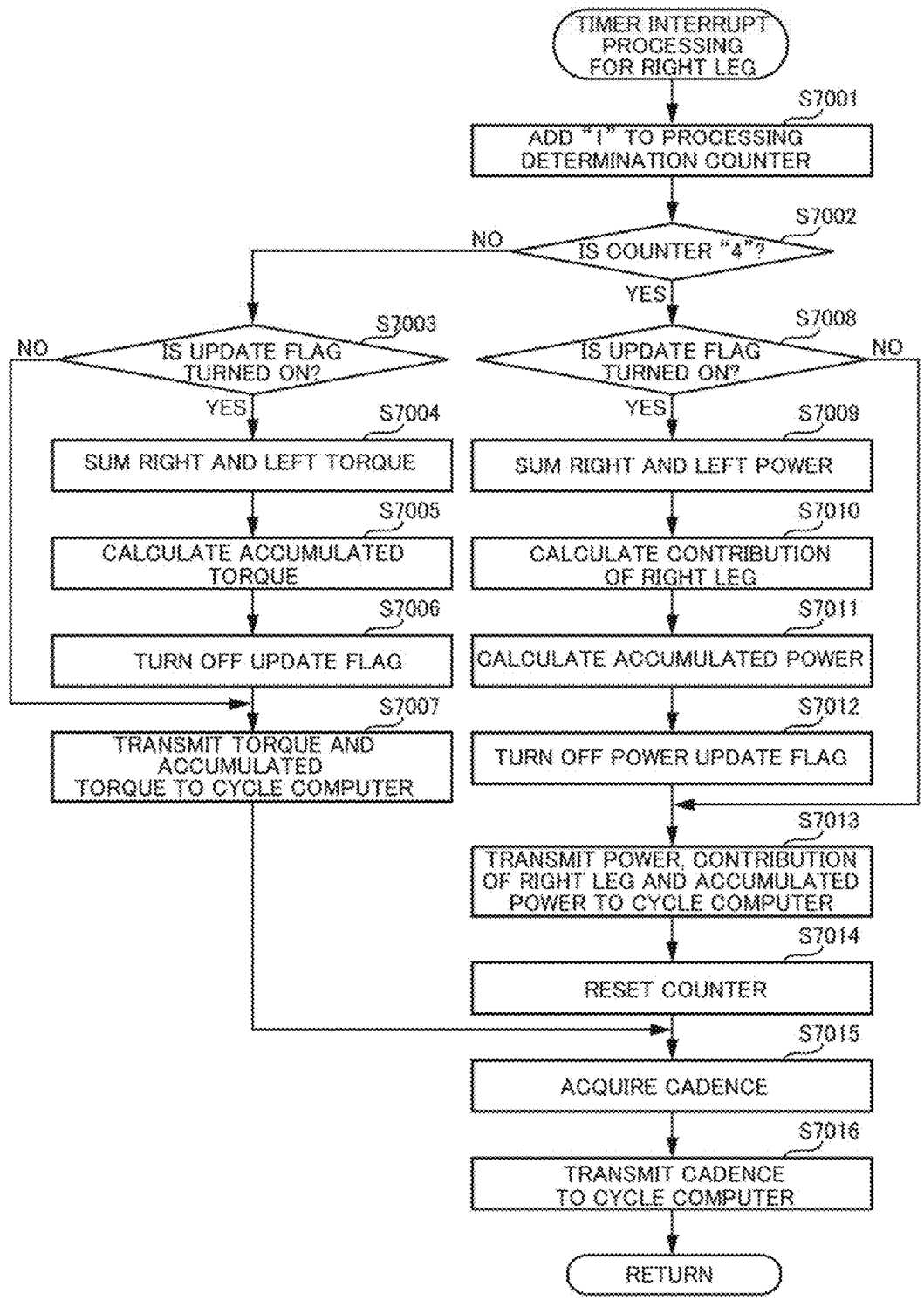
FIG. 16 is a flowchart showing timer interrupt processing for the right leg in the power meter mode.

Next, interrupt processing on receiving left leg data in the pedaling monitor mode will be described with reference to FIG. 15. Upon receiving the left torque data and the left power data from the left leg unit 7, the CPU 61a stores the received data in the left torque data storage area and the left power data storage area, respectively, in the RAM 61c in step S6001, and terminates this interrupt processing.

<Timer Interrupt Processing for the Right Leg in the Power Meter Mode>

Next, timer interrupt processing for the right leg in the power meter mode will be described with reference to FIG. 16A. When the oscillating circuit 61d provided in the right leg unit 6 generates a clock pulse per predetermined period, the following timer interrupt processing is performed. When receiving a pulse signal from the oscillating circuit 61d, the CPU 61a checks the functional mode flag storage area. Here, when the power mode flag is turned on, the CPU 61a performs steps S7001 to S7016, and meanwhile, when the pedaling monitor mode flag is turned on, the CPU 61a performs steps S7501 to S7504. As described above, a pulse signal is outputted to the CPU 61a at 4.00 Hz in the power meter mode. Therefore, in the power meter mode, the timer interrupt processing for the right leg is performed at 4.00 Hz.

In the step S7001, the CPU 61 adds "1" to the counter value of a processing determination counter provided in the RAM 61c. In step S7002, the CPU 61a determines whether or not the processing determination counter is "4". When determining that the processing determination counter is "4", the CPU 61a moves the step to the step S7008. On the other hand, when determining that the processing determination counter is not "4", the CPU 61a moves the step to the step S7003.

In the step S7003, the CPU 61a determines whether or not the torque update flag is turned on in the torque update flag storage area of the RAM 61c. When determining that the torque update flag is not turned on, the CPU 61a moves the step to the step S7007. On the other hand, when determining that the torque update flag is turned on, the CPU 61a moves the step to the step S7004.

In the step S7004, the CPU 61a sums the left torque indicated by the left torque data that is transmitted from the left leg unit 7 and is stored in the left torque data storage area and the right torque indicated by the right torque data that is stored in the right torque data storage area to obtain the total torque (with both legs), and stores the total torque data in a total torque data storage area of the RAM 61c.

In the S7005, the CPU 61a calculates the accumulated torque. For example, the CPU 61a calculates the accumulated torque for a predetermined period, and stores the accumulated torque data indicating the accumulated torque in the accumulated torque storage area of the RAM 61c. Here, by adding the current total torque to the previous accumulated torque stored in the accumulated torque storage area, the CPU 61a may calculate a new accumulated torque and store the accumulated torque data in the accumulated torque data storage area.

In the step 37006, the CPU 61a turns off the torque update flag. In the step S7007, the CPU 61a transmits to the cycle computer 1 the total torque data stored in the total torque data storage area and the accumulated torque data stored in the accumulated torque data storage area, and moves the step to the step S7015.

In the step S7008, the CPU 61a determines whether or not the power update flag is turned on in the power update flag storage area of the RAM 61c. When determining that the power update flag is not turned on, the CPU 61a moves the step to the step S7013. On the other hand, when determining that the power update flag is turned on, the CPU moves the step to the step S7009.

In the step S7009, the CPU 61a sums the left power indicated by the left power data that is transmitted from the left leg unit 7 and is stored in the left power data storage area and the right power indicated by the right power data that is stored in the right power data storage area to obtain the total power (with both legs), and stores the total power data indicating the total power in the total power data storage area of the RAM 61a.

In the step S7010, the CPU 61a calculates the contribution of the right leg. That is, the CPU 61a calculates the contribution of the right leg that is the proportion of the right power to the total power calculated in the step S7009, and stores the data of the contribution of the right leg in a right leg contribution data storage area.

In the step S7011, the CPU 61a calculates the accumulated power. For example, the CPU 61a calculates the accumulated power, and stores accumulated power data indicating the accumulated power in an accumulated power storage area of the RAM 61c. Here, by adding the current power to the accumulated power stored in the accumulated power storage area, the CPU 61a may calculate new accumulated power and store the accumulated power data in the accumulated power storage area.

In the step S7012, the CPU 61a turns off the power update flag. In the step S7013, the CPU 61a transmits to the cycle computer 1 the total power data stored in the total power data storage area, the right leg contribution data stored in the right leg contribution data storage area, and the accumulated power data stored in the accumulated power data storage area, and moves the step to the step S7014.

In the step S7014, the CPU 61a resets the processing determination counter (that is, the counter value becomes "0"). As described above, because the processing determination counter is reset when the counter value is "4", the power, the contribution of the right leg, and the accumulated power must be calculated every four times in the timer interrupt processing during the power meter mode of the right leg unit 6.

In the step S7015, the CPU 61a acquires cadence data from the cadence detection sensor 5. In the step S7016, the CPU 61a transmits the cadence data to the cycle computer 1, and terminates the timer interrupt processing for the right leg in the power meter mode.

<Timer Interrupt Processing for the Right Leg in the Pedaling Monitor Mode>

Figure 17:
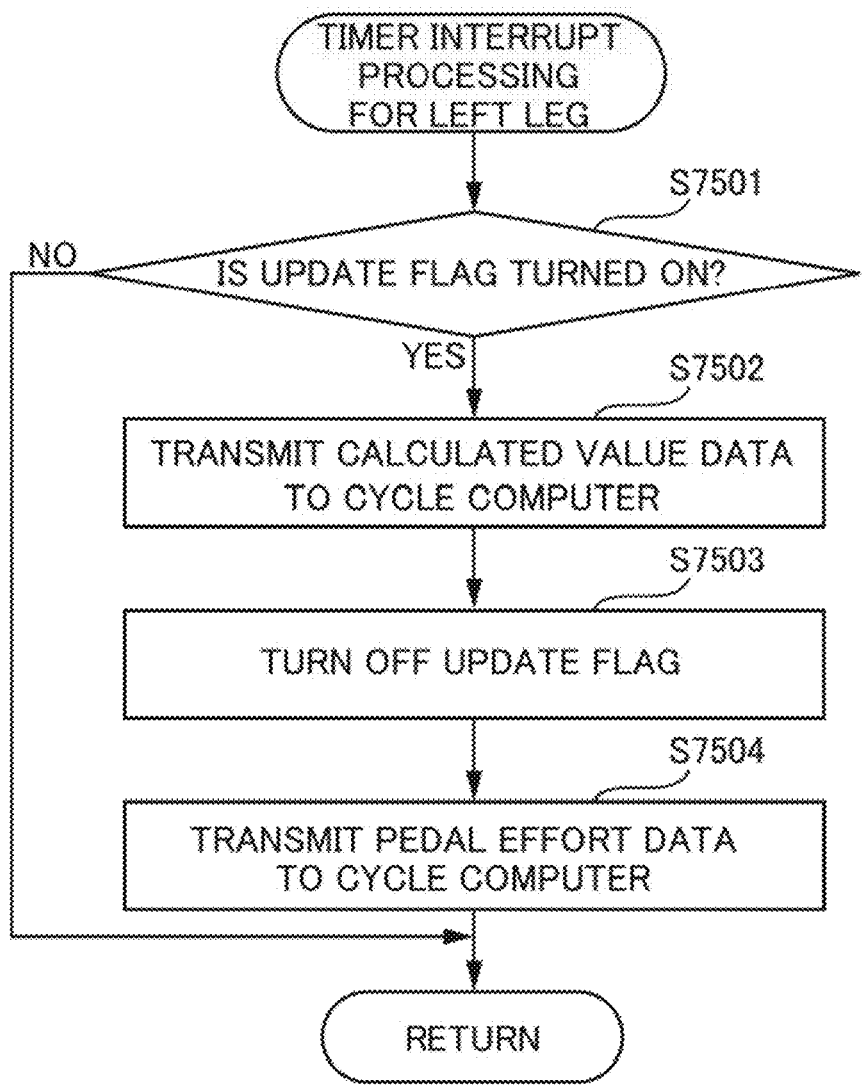
FIG. 17 is a flowchart showing timer interrupt processing for the right leg in the pedaling monitor mode.

Next, timer interrupt processing for the right leg in the pedaling monitor mode will be described with reference to FIG. 17. As described above, a pulse signal is outputted to the CPU 61a at 6.00 Hz in the pedaling monitor mode. Therefore, in the pedaling monitor mode, the timer interrupt processing for the right leg is performed at 6.00 Hz.

In the step S7501, the CPU 61a determines whether or not the update flag is turned on in the update flag storage area of the RAM 61c. When determining that the update flag is turned on, the CPU 61a transmits the right torque data and the right power data stored in the RAM 61c to the cycle computer 1 in step the S7502. In the step S7503, the CPU 61a turns off the update flag.

Next, in the step S7504, the CPU 61a transmits to the cycle computer 1 a plurality of pedal effort data (for one turn of the crank B31), which are associated with predetermined crank rotation angles stored in the pedal effort data storage area of the RAM 61c, and terminates the timer interrupt processing for the right leg. When determining that the update flag is not turned on in the step S7501, the CPU 61a simply terminates the timer interrupt processing for the right leg.

As described above, the pedaling monitor 100 including the right leg unit 6 and the left leg unit 7 can measure the pedal effort of the right leg and the pedal effort of the left leg individually, and analyze the pedal effort at a predetermined crank rotation angle for each leg. Each of the right leg unit 6 and the left leg unit 7 has the power meter mode. In this power meter mode, the left torque data and the left power data measured by the left leg unit 7 is transmitted to the right leg unit 6, and the left torque and the left power indicated by the transmitted data is added to the right torque and the right power measured by the right leg unit 6. As a result, the total torque and the total power are calculated, and the result of the calculation is transmitted to the cycle computer 1 at a predetermined frequency (predetermined standard, for example, "ANT"). Therefore, even if the cycle computer 1 is not designed to measure the pedal effort for both legs individually, for example, even if the cycle computer 1 only functions as a simple power meter, the right leg unit 6 and the left leg unit 7 can be applied to that cycle computer 1. By this means, it is possible to improve the versatility of the right leg unit 6 and the left leg unit 7. Here, the left torque and the left power constitute the first information of the present invention, and the right torque and the right power constitute the second information of the present invention.

In addition, in the power meter mode, the data transmission frequency is different between the right leg unit 6 (4.0 Hz) and the left leg unit 7 (4.10 Hz). Therefore, even if a data collision occurs, it is possible to prevent an unavailable period from being prolonged. Moreover, the data transmission interval between the left leg unit 6 and the right leg unit 7 is shorter than the data transmission interval between the left leg unit 7 and the cycle computer 1, so that it is possible to prevent incomplete data from being transmitted. Here, "incomplete data" means the total torque and the total power consisting of the torque and the power measured by the left leg unit 7 that transmits data to the cycle computer 1.

Moreover, with the present embodiment, the power meter mode is initially set. Therefore, even if the cycle computer 1 is not designed to measure the pedal effort for both legs individually, it is possible to reliably apply the right leg unit 6 and the left leg unit 7 to the cycle computer 1.

Embodiment 2

Figure 19:
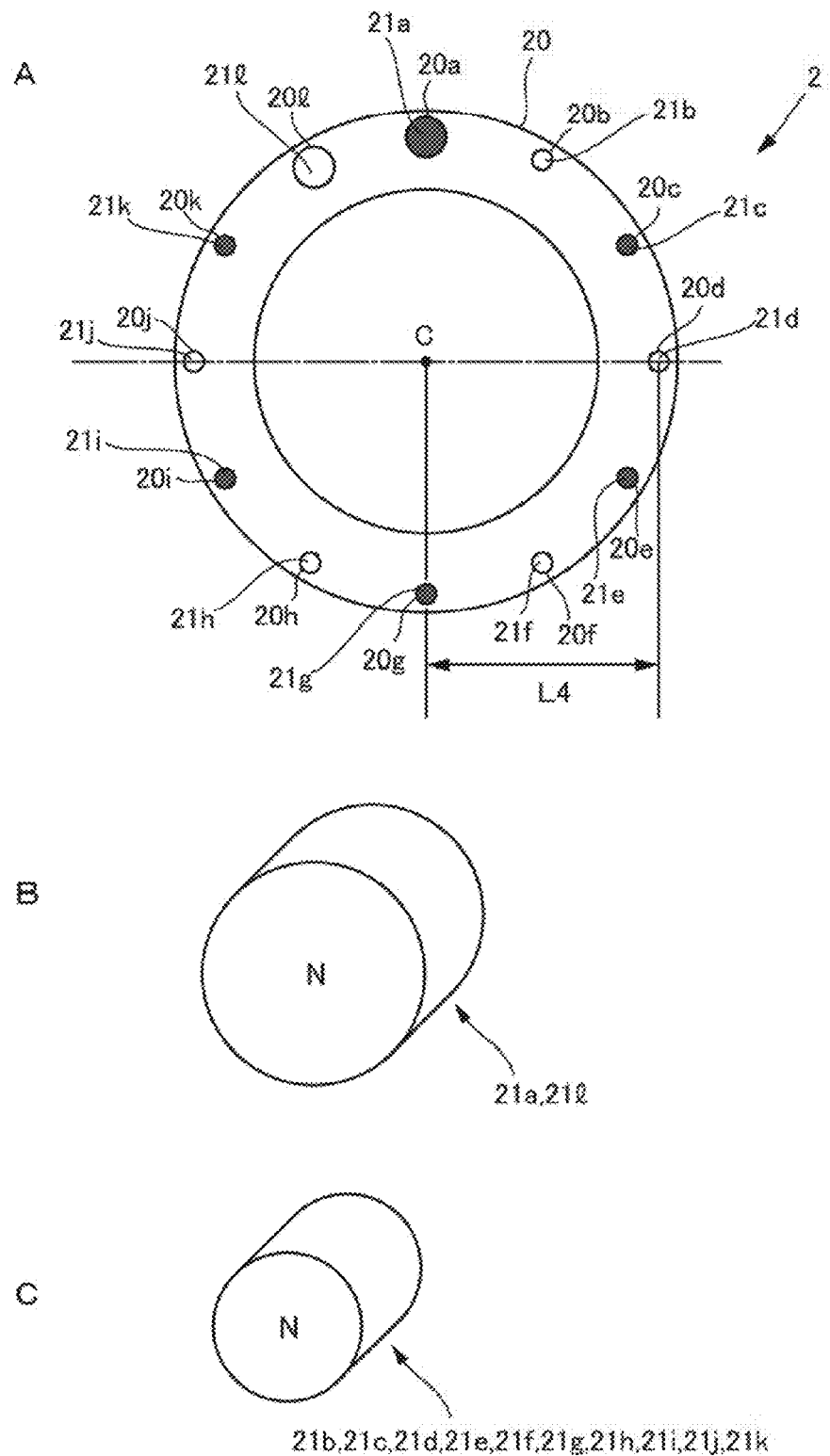
FIG. 19A is a schematic diagram showing the crank rotation angle detection sensor according to Embodiment 2.
FIG. 19B is a schematic diagram showing the crank rotation angle detection sensor according to Embodiment 2.
FIG. 19C is a schematic diagram showing the crank rotation angle detection sensor according to Embodiment 2.

Next, the crank rotation angle detection sensor 2 according to Embodiment 2 will be described with reference to FIG. 19.

This crank rotation angle detection sensor 2 has the same configuration as in Embodiment 1 other than the shape of the magnets 21a to 21l, the fixed positions and the fixed directions of the magnets 21a to 21l in the frame member 20, and the fixed position and the fixed direction of the magnetic sensor 22. The same components are given the same names and the same reference numerals, and descriptions thereof are omitted.

With the present embodiment, the frame member 20 is formed of a circular ring and has an outer diameter of 54 mm and an inner diameter of 47 mm, like Embodiment 1. Cylindrical insertion holes 20a to 20l into which the magnets 21a to 21l are inserted are formed in the frame member 20 in its thickness direction. The centers (central axes) of the cross-sections of the insertion holes 20a to 20l are arranged every 30 degrees on the circumference of the circle with a radius of 50 mm from the center C. The insertion holes 20a to 20l can be classified into two kinds, "insertion holes 20a and 20l" and "insertion holes 20b to 20k." That is, each of the inversion holes 20a and 20l has a diameter of 6 mm, while each of the insertion wholes 20b to 20k has a diameter of 4 mm.

Then, the magnets 21a to 21l are inserted and fixed in the insertion holes 20a to 20l. That is, the magnets 21a to 21l are also formed of cylinders, and the cross-section of each of the magnets 21a and 21l is formed of a circle with a radius of 6 mm while the cross-section of each of the magnets 21b to 21k is formed of a circle with a radius of 4 mm. In addition, each of the magnets 21a and 21b has the north pole at its one end and also has the south pole at the other end. The central axes of the magnets 21a to 21l inserted into the insertion holes 20a to 20l are parallel to the crank axle of the crank B31. Moreover, the magnets 21a to 21l are arranged alternately to face the directions opposite to each other. The north pole of the reference magnet 21a faces the crank B31.

Although the configuration of the magnetic sensor 22 is the same as in Embodiment 1, the relationship between the magnetic sensor 22 and the magnets 21a to 21l fixed to the chain ring B34 is different from that in Embodiment 1. To be more specific, in order to allow the first element 22a and the second element 22b to detect the magnets 21a to 21l on the frame member 20 fixed to the frame B1, the magnetic sensor 22 is provided such that the measurement direction of the first element 22a and the second element 22b is parallel to the central axes of the magnets 21a to 21l, that is, orthogonal to the plane of the frame member 20 and the magnets 21a and 21b face the movement paths of the first and second elements 22a and 22b.

In addition, the frame member 20 and the magnetic sensor are appropriately fixed such that the reference magnet 21a on the frame member 20 faces the second element 22b of the fixed magnetic sensor 22 when the crankshaft B311 points to twelve o'clock, that is, the crank rotation angle is 0 degrees. The position in which the magnetic sensor 22 is fixed is not limited.

With the present embodiment, any magnet cannot exist on the opposite side of the magnet to be detected by the first element 22a. Therefore, it is possible to reduce the restriction on the relationship between the distance from the center C to each of the magnets 21a to 21l and the distance L3 from the outer end of each of the magnets 21a to 21l to the second element 22b. By this means, it is possible to reduce the size of the frame member 20, and therefore to reduce the cost.

Embodiment 3

Figure 20:
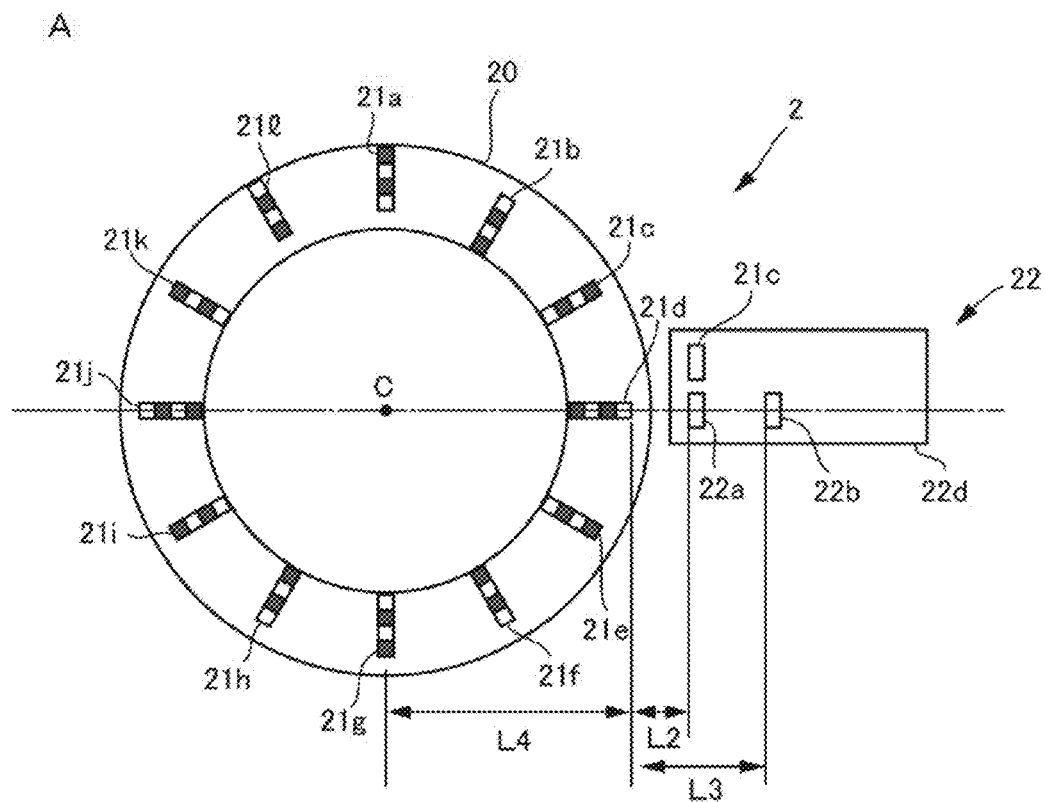
FIG. 20A is a schematic diagram showing the crank rotation angle detection sensor according to Embodiment 3.
FIG. 20B is a schematic diagram showing the crank rotation angle detection sensor according to Embodiment 3.
Figure 20:
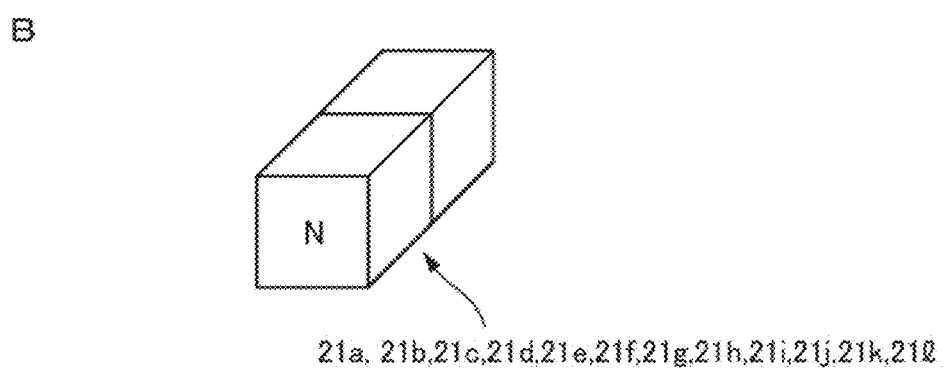

Next, the crank rotation angle detection sensor 2 according to Embodiment 3 will be described with reference to FIG. 20.

This crank rotation angle detection sensor 2 has the same configuration as in Embodiment 1 other than the kind of the magnets 21a to 21l, the fixed positions of the magnets 21a to 21l in the frame member 20, and the fixed position of the magnetic sensor 22. The same components are given the same names and the same reference numerals, and descriptions thereof are omitted.

With the present embodiment, all the magnets 21a to 21l are formed by the same kind of magnets (for example, each size is 2 mm×2 mm×3 mm like Embodiment 1). However, the positions in which the magnets 21a and the magnet 21l are fixed is different from those in Embodiment 1. To be more specific, the distance between the center C of the frame member 20 and each of the magnets 21a and 21l is different from that in Embodiment 1. More specifically, the reference magnet 21a and the reset magnet 21l are fixed to the frame member 20 such that the outer ends of the reference magnet 21a and the reset magnet 21l contact the outer periphery of the frame member 20. The other magnets 21b to 21k are fixed to the frame member 20 such that the inner ends contact the inner periphery of the frame member 20. The magnetic sensor 22 is fixed to the chain ring B34 such that the first element 22a can detect all the magnets 21a to 21l while the second element 22b can detect only the reference magnet 21a and the reset magnet 21l.

In this way, the magnets 21a to 21l are formed by the same kind of magnets, so that it is possible to reduce the production cost of the crank rotation angle detection sensor 2.

Embodiment 4

Figure 21:
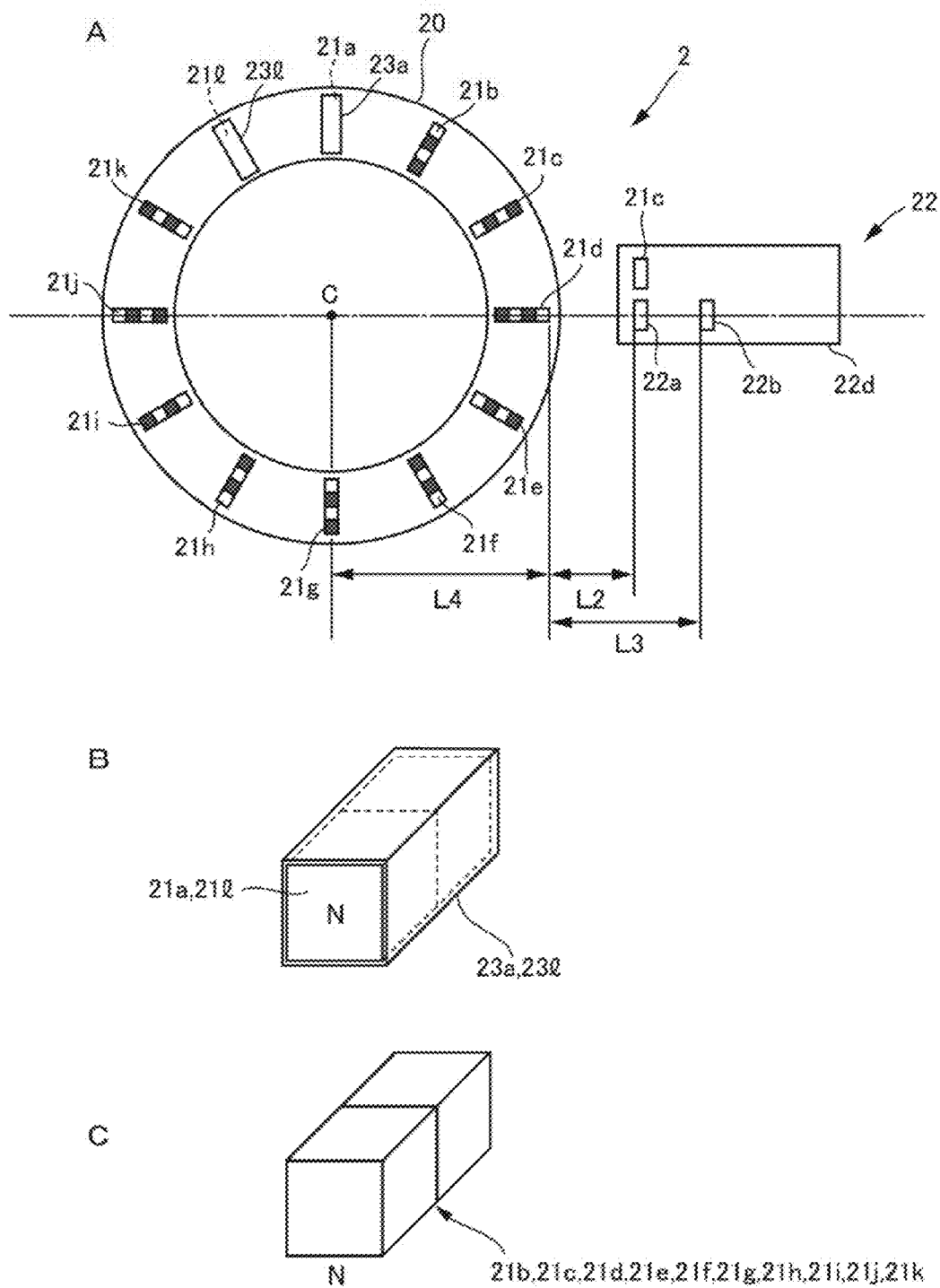
FIG. 21A is a schematic diagram showing the crank rotation angle detection sensor according to Embodiment 4.
FIG. 21B is a schematic diagram showing the crank rotation angle detection sensor according to Embodiment 4.
FIG. 21C is a schematic diagram showing the crank rotation angle detection sensor according to Embodiment 4.

Next, the rotation angle detection sensor 2 according to Embodiment 4 will be described with reference to FIG. 21. This crank rotation angle detection sensor 2 has the same configuration as in Embodiment 1 other than the magnets 21a and 21l. The same components are given the same names and the same reference numerals, and descriptions thereof are omitted.

With the present embodiment, all the magnets 21a to 21l are formed by the same kind of magnets (for example, each size is 2 mm×2 mm×3 mm like Embodiment 1). With the present embodiment, the magnets 21a to 21l are fixed to the frame member 20 at the positions with the same distance from the center C of the frame member 20. However, the present embodiment is different from Embodiment 1 in that bobbins 23 are mounted to only the reference magnet 21a and the reset magnet 21l. Therefore, reference magnet 21a and the reset magnet 21l with the bobbins 23 have stronger magnetic fields than of the other magnets 21b to 21k. Therefore, it is possible to allow the second element 22b to detect only the reference magnet 21a and the reset magnet 21l. In this way, the magnets 21a to 21l are formed by the same kind of magnets, so that it is possible to reduce the production cost of the crank rotation angle detection sensor 2.

Another Embodiment

With Embodiments 1 to 4, a configuration has been described where the frame member 20 and the magnet group 21 are mounted to the frame B1 while the magnetic sensor 22 is mounted to the chain ring B34. However, it is by no means limiting, but another configuration is possible where the frame member 20 and the magnet group 21 are mounted to the chain ring B34 while the magnetic sensor 22 is mounted to the frame B1. In addition, although the crank rotation angle detection sensor 2 is mounted to the bicycle B, part or all thereof may be incorporated in the bicycle B. For example, the frame member 20 and the magnetic group 21 may be incorporated into and integrated with the chain ring B34. In this case, only the magnet group 21 may be incorporated into and integrated with the chain ring B34 without the frame member 20.

Figure 22:
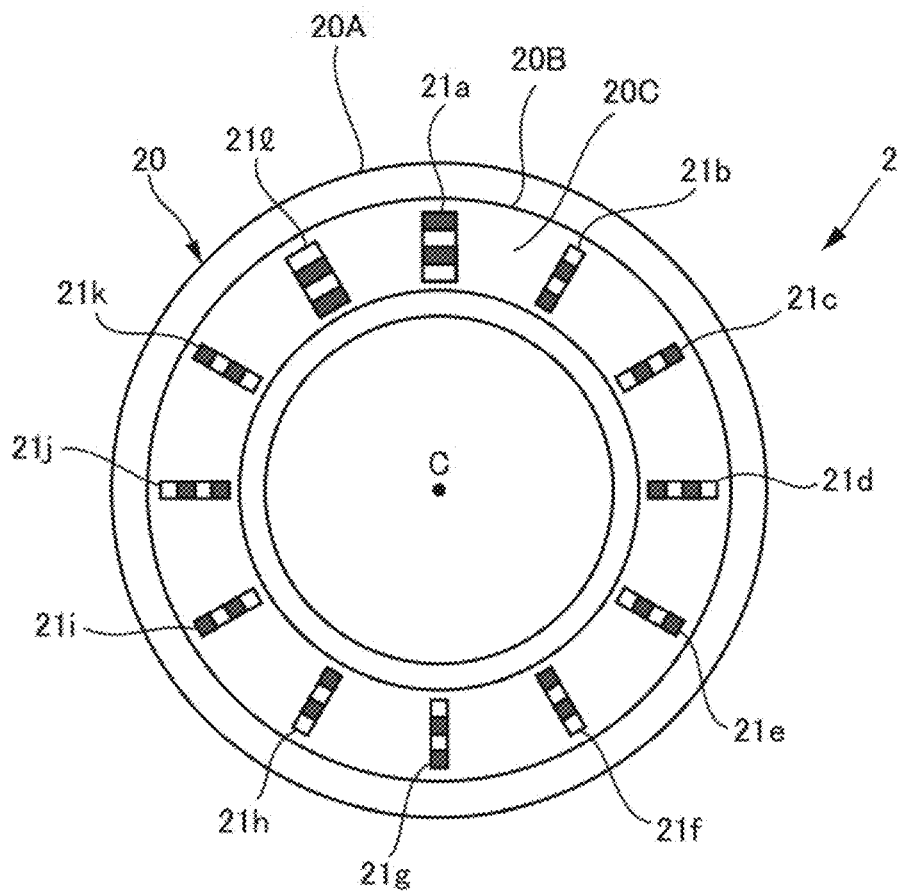
FIG. 22 is a schematic diagram showing the crank rotation angle detection sensor according to another embodiment.

In addition, with Embodiments 1 to 4, a configuration of the crank rotation angle detection sensor 2 has been described where the magnetic group 21 is immovable with respect to the frame member 20. However, it is by no means limiting, but another configuration is possible where, as shown in FIG. 22, the frame member 20 is constituted by an annular base 20A having an annular groove 20B and a rotating member 20C engaging with the annular groove B. The magnet group 21 is fixed to the rotating member 20C. The rotating member 20C can rotate about the center C and can be fixed to the base 20A at a desired position. In this case, the frame member 20 and the magnetic sensor 22 are appropriately mounted to the bicycle B, and then the rotating member 20C is rotated. By this means, it is possible to make an adjustment of crank rotation angle=0 degrees. This helps make it easy to mount the crank rotation angle detection sensor 2.

Moreover, a configuration has been described where the crank rotation angle detection sensor 2 has the reference magnet 21a and its dedicated element (second element) 22b in order to detect a specific crank rotation angle (0 degrees). However, it is by no means limiting, but a plurality of reference magnets and their dedicated elements may be provided in order to detect a plurality of specific crank rotation angles. That is, for detecting the first reference point (e.g. 0 degrees), there may be provided a first reference magnet and a first reference element that detects only the first reference magnet, and, for detecting the second reference point (180 degrees), there may be provided a second reference magnet and a second reference element that detects only the first reference magnet and the second reference magnet. In this way, a plurality of reference points are set, so that it is possible to eliminate the effects of inverse rotation or noise, and therefore to detect a predetermined crank rotation angle.

Moreover, with Embodiments 1 to 4, the reset magnet 21l is provided to reset the second element 22b in Hi. The reason is that Hi is maintained unless the second element 22b detects a magnetic field with a predetermined intensity, with Embodiments 1 to 4. Therefore, the second element 22b automatically becomes "0", or is reset, the reset magnet 21l is not required. However, the second element 22b outputs Lo, so that it is possible to detect the second reference point of the crank rotation angle.

Moreover with Embodiments 1 to 4, although the neodymium magnets are used, the other kinds of magnets are applicable. Moreover, the interval at which the crank rotation angle is detected is not limited to, and also the reference crank rotation angle is not limited to the above-described Embodiments 1 to 4. Furthermore, the shape of the frame member 20 is not limited to Embodiments 1 to 4.

In addition, with Embodiments 1 to 4, a configuration has been described where, in the power meter mode, the calculated value data obtained by the left leg unit 7 is transmitted to the right leg unit 6, the calculated values are summed in the right leg unit 6, and the summed value is transmitted to the cycle computer 1. However, it is by no means limiting, but another configuration is possible where the calculated value data obtained by the right leg unit 6 is transmitted to the left leg unit 7, the calculated values are summed in the left leg unit 7, and the summed value is transmitted to the cycle computer 1.

Moreover, with Embodiments 1 to 4, although the strain detection sensor is used to measure the pedal effort, the kind of sensor is not limited to the strain detection sensor. Moreover, with Embodiment 1, torque and power are measured by the right leg unit 6 and the left leg unit 7, however it is by no means limiting. Torque and power may be calculated by the cycle computer by transmitting pedal effort to the cycle computer 1.

Moreover, in addition to a bicycle running on the road, the pedaling monitor 100 is applicable, to a vehicle that has cranks connected to pedals and is driven by rotating the cranks, such as a stationary exercise bike in a gym, and a boat (e.g. swan boat) which can be driven forward by a person who is pedaling.

In addition, with Embodiments 1 to 4, the cycle computer 1 displays the pedal effort and the average torque value. However, it is by no means limiting, but the pedal, effort and the average torque value may be displayed by application software of a mobile terminal such as a cellular phone. In this case, the mobile terminal may be set on the bicycle B or carried by the cyclist.

REFERENCE SIGNS LIST 1 cycle computer
2 crank rotation angle detection sensor
3 rotational component detection sensor
4 radial component detection sensor
5 cadence detection sensor
6 right leg unit
7 left leg unit
20 frame
20a insertion hole
21 magnet
21a reference magnet
21l reset magnet
22 magnetic sensor
22a first element
22b second element
22c third element
100 pedaling monitor
B bicycle
B1 frame
B2 wheel
B21 front wheel
B22 rear wheel
B3 drive mechanism
B31 crank
B311 right crankshaft
B312 left crankshaft
B32 pedal
B321 right pedal
B322 left pedal
B33 chain
B34 chain ring
B4 handle
B5 saddle
B6 spoke
B7 chain stay
B8 tire

The invention claimed is:

1. A power meter for use with a vehicle that individually measures a force applied to each of pedals of the vehicle, when cranks connected to the pedals are rotated, the power meter comprising:
a first measurement unit configured to measure a first force applied to a first pedal and calculate predetermined first information on the first pedal based on a measured value of the first force;
a second measurement unit configured to measure a second force applied to a second pedal and calculate predetermined second information on the second pedal based on a measured value of the second force, the second information being a same kind of the first information;
a controller; and
a mode switch configured to switch between a first mode set as default and a second mode, wherein,
the first mode in which the first measurement unit transmits the first information to the second measurement unit, the second measurement unit adds the first information to the second information to form a sum calculation and then transmits the sum calculation to the controller, and
the second mode in which the first measurement unit and the second measurement unit each individually transmit respectively the first information and the second information to the controller.

2. The power meter according to claim 1, wherein:
the first measurement unit transmits the first information to the second measurement unit at a first period; and
the second measurement unit transmits the sum calculation to the predetermined controller at a second period that is different from the first period.

3. The power meter according to claim 2, wherein the first period is shorter than the second period.

4. A program stored in a power meter that measures power of pedals of a vehicle when cranks connected to the pedals are rotated, the program causing the power meter to function as:
a first calculation part configured to measure a force applied to a first pedal by using a first measurement part, and to calculate predetermined first information on the first pedal based on a measured value of the first force; a second calculation part configured to measure a force applied to a second pedal by using the second measurement part, and to calculate predetermined second information on the second pedal that is a same kind as the first information based on a measured value of the second force, and a mode switch configured to switch between a first mode set as default and a second mode by operating an operation part provided in a controller, wherein,
in the first mode, the first calculation part transmits the first information to the second calculation part, and the second calculation part adds the first information to the second information to form a sum calculation, and then transmits the sum calculation to the controller, and in the second mode, the first calculation part and the second calculation part individually transmit respectively the first information and the second information to the controller.

5. A non-transitory computer-readable recording medium having the program of claim 4 stored in the power meter.

6. A power meter for a vehicle with and first and second cranks connected respectively to first and second pedals, the power meter comprising:
a first measurement unit that measures a force applied to the first pedal and calculates predetermined first information data concerning the first pedal based on a measured value of the force applied to the first pedal;
a second measurement unit that measures a force applied to the second pedal and calculate predetermined second information data concerning the second pedal based on a measured value of the force applied to the second pedal;
a controller comprising an operation part, a processing unit, and a memory; and
a mode switch configured to switch between a first mode and a second mode by operating the operation part of the controller, wherein, in the first mode, the first measurement unit transmits the first information data to the second measurement unit, the second measurement unit adds the first information data to the second information data to calculate a summed information data, and the second measurement unit transmits the summed information data to the controller, and in the second mode, the first measurement unit and the second measurement unit individually respectively transmit the first information data and the second information data to the controller.

7. The power meter according to claim 6, wherein, the first measurement unit transmits the first information data to the second measurement unit at a first period, and the second measurement unit transmits the summed information data to the controller at a second period, the first and second periods being different.

8. The power meter according to claim 7, wherein the first period is shorter than the second period.

9. The power meter according to claim 6 in combination with the first and second pedals, and the first and second cranks.

* * * * *

UNITED STATES PATENT AND TRADEMARK OFFICE
CERTIFICATE OF CORRECTION

| | | |
|---|---|---|
| PATENT NO. | : 9,182,304 B2 | Page 1 of 1 |
| APPLICATION NO. | : 14/348060 | |
| DATED | : November 10, 2015 | |
| INVENTOR(S) | : Tsuyoshi Namiki et al. | |

It is certified that error appears in the above-identified patent and that said Letters Patent is hereby corrected as shown below:

Claims

Column 24, Line 41:

In claim 4, at the beginning of line 15,

'in the first mode,' should be changed to

--in the first mode allowing,--.

Signed and Sealed this
Third Day of May, 2016

Michelle K. Lee
*Director of the United States Patent and Trademark Office*